United States Patent
Goyal

(10) Patent No.: US 9,495,479 B2
(45) Date of Patent: *Nov. 15, 2016

(54) TRAVERSAL WITH ARC CONFIGURATION INFORMATION

(71) Applicant: Cavium, Inc., San Jose, CA (US)

(72) Inventor: Rajan Goyal, Saratoga, CA (US)

(73) Assignee: Cavium, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,807

(22) Filed: Oct. 17, 2014

(65) Prior Publication Data

US 2015/0066991 A1  Mar. 5, 2015

Related U.S. Application Data

(63) Continuation of application No. 13/905,711, filed on May 30, 2013, now Pat. No. 8,886,680, which is a continuation of application No. 12/277,129, filed on Nov. 24, 2008, now Pat. No. 8,473,523.

(60) Provisional application No. 61/196,717, filed on Oct. 31, 2008.

(51) Int. Cl.
*G06F 7/00* (2006.01)
*G06F 17/30* (2006.01)
*H04L 29/06* (2006.01)

(52) U.S. Cl.
CPC ... *G06F 17/30958* (2013.01); *G06F 17/30985* (2013.01); *G06F 2221/2145* (2013.01); *H04L 63/1416* (2013.01)

(58) Field of Classification Search
CPC .................. G06F 17/30958; G06F 17/30867; G06F 17/30961; G06F 17/30097; G06Q 10/10

USPC .......................................................... 707/798
See application file for complete search history.

(56) References Cited

U.S. PATENT DOCUMENTS 5,230,061 A   7/1993 Welch
5,327,544 A   7/1994 Lee et al.
(Continued)

FOREIGN PATENT DOCUMENTS

EP          1 607 823 A2   12/2005
WO   WO 2004/013777 A1    2/2004
(Continued)

OTHER PUBLICATIONS

Alicherry et al., "High Speed Pattern Matching for Network IDS/IPS," IEEE, pp. 187-196, 2006.
(Continued)

*Primary Examiner* — Robert Beausoliel, Jr.
*Assistant Examiner* — Michael Pham
(74) *Attorney, Agent, or Firm* — Hamilton, Brook, Smith & Reynolds, P.C.

(57) ABSTRACT

An apparatus, and corresponding method, for generating a graph used in performing a search for a match of at least one expression in an input stream is presented. The graph includes a number of interconnected nodes connected solely by valid arcs. A valid arc may also include a nodal bit map including structural information of a node to which the valid arc points to. A walker process may utilize the nodal bit map to determine if a memory access is necessary. The nodal bit map reduces the number of external memory access and therefore reduces system run time.

30 Claims, 22 Drawing Sheets

(56) References Cited

U.S. PATENT DOCUMENTS

| | | | |
|---|---|---|---|
| 6,047,283 A | 4/2000 | Braun | |
| 6,076,087 A | 6/2000 | Suciu | |
| 6,192,282 B1 | 2/2001 | Smith et al. | |
| 6,493,698 B1 | 12/2002 | Beylin | |
| 6,560,610 B1 | 5/2003 | Eatherton et al. | |
| 6,728,732 B1 | 4/2004 | Eatherton et al. | |
| 6,768,991 B2 | 7/2004 | Hearnden | |
| 6,925,641 B1 | 8/2005 | Elabd | |
| 6,952,694 B2 | 10/2005 | Mathur et al. | |
| 7,028,141 B2 | 4/2006 | Ohba | |
| 7,046,848 B1 | 5/2006 | Olcott | |
| 7,085,918 B2 | 8/2006 | Sharangpani et al. | |
| 7,093,023 B2 | 8/2006 | Lockwood et al. | |
| 7,185,081 B1 | 2/2007 | Liao | |
| 7,188,168 B1 | 3/2007 | Liao | |
| 7,225,188 B1 | 5/2007 | Gai et al. | |
| 7,240,048 B2 | 7/2007 | Pontius | |
| 7,249,149 B1 | 7/2007 | Eatherton et al. | |
| 7,301,541 B2 | 11/2007 | Hansen et al. | |
| 7,305,372 B2 | 12/2007 | Bridges et al. | |
| 7,308,446 B1 | 12/2007 | Panigrahy et al. | |
| 7,440,304 B1 | 10/2008 | Raj | |
| 7,454,588 B2 | 11/2008 | Greicar | |
| 7,565,380 B1 | 7/2009 | Venkatachary | |
| 7,689,530 B1 | 3/2010 | Williams, Jr. et al. | |
| 7,702,629 B2 | 4/2010 | Cytron et al. | |
| 7,860,849 B1 * | 12/2010 | Venkatachary ... | G06F 17/30985 707/705 |
| 7,949,683 B2 | 5/2011 | Goyal | |
| 8,180,803 B2 | 5/2012 | Goyal | |
| 8,301,788 B2 | 10/2012 | Bouchard et al. | |
| 8,392,590 B2 | 3/2013 | Bouchard et al. | |
| 8,473,523 B2 | 6/2013 | Goyal | |
| 8,560,475 B2 | 10/2013 | Hussain et al. | |
| 8,818,921 B2 | 8/2014 | Hussain et al. | |
| 8,819,217 B2 | 8/2014 | Hussain et al. | |
| 8,886,680 B2 | 11/2014 | Goyal | |
| 9,336,328 B2 | 5/2016 | Hussain et al. | |
| 2002/0099909 A1 | 7/2002 | Meyer | |
| 2003/0051043 A1 | 3/2003 | Wyschogrod et al. | |
| 2003/0065800 A1 | 4/2003 | Wyschogrod et al. | |
| 2003/0110208 A1 | 6/2003 | Wyschogrod et al. | |
| 2003/0195874 A1 | 10/2003 | Akaboshi | |
| 2004/0049596 A1 | 3/2004 | Schuehler et al. | |
| 2004/0059443 A1 | 3/2004 | Sharangpani | |
| 2004/0071152 A1 | 4/2004 | Wolrich et al. | |
| 2004/0083387 A1 | 4/2004 | Dapp et al. | |
| 2004/0098384 A1 | 5/2004 | Min et al. | |
| 2004/0162826 A1 | 8/2004 | Wyschogrod et al. | |
| 2004/0172234 A1 | 9/2004 | Dapp et al. | |
| 2004/0176945 A1 | 9/2004 | Inagaki et al. | |
| 2004/0179477 A1 | 9/2004 | Lincoln et al. | |
| 2004/0215593 A1 | 10/2004 | Sharangpani et al. | |
| 2004/0225999 A1 | 11/2004 | Nuss | |
| 2004/0250045 A1 | 12/2004 | Dowling | |
| 2004/0267779 A1 | 12/2004 | Carter et al. | |
| 2005/0012521 A1 | 1/2005 | Sharangpani et al. | |
| 2005/0097514 A1 | 5/2005 | Nuss | |
| 2005/0108518 A1 | 5/2005 | Pandya | |
| 2005/0138276 A1 | 6/2005 | Navada et al. | |
| 2005/0238010 A1 | 10/2005 | Panigrahy et al. | |
| 2005/0238022 A1 | 10/2005 | Panigrahy et al. | |
| 2005/0240999 A1 | 10/2005 | Rubin et al. | |
| 2005/0251509 A1 | 11/2005 | Pontius | |
| 2005/0273450 A1 | 12/2005 | McMillen et al. | |
| 2006/0059165 A1 | 3/2006 | Bosloy et al. | |
| 2006/0069872 A1 | 3/2006 | Bouchard et al. | |
| 2006/0075206 A1 | 4/2006 | Bouchard et al. | |
| 2006/0085533 A1 | 4/2006 | Hussain et al. | |
| 2006/0101195 A1 | 5/2006 | Jain | |
| 2006/0242123 A1 | 10/2006 | Williams, Jr. | |
| 2007/0006293 A1 | 1/2007 | Balakrishnan et al. | |
| 2007/0011734 A1 | 1/2007 | Balakrishnan et al. | |
| 2007/0038775 A1 | 2/2007 | Parekh et al. | |
| 2007/0038798 A1 | 2/2007 | Bouchard et al. | |
| 2007/0075878 A1 | 4/2007 | Furodet et al. | |
| 2007/0133593 A1 | 6/2007 | Shankara | |
| 2007/0276788 A1 | 11/2007 | Cohen | |
| 2008/0027934 A1 | 1/2008 | Duxbury | |
| 2008/0046423 A1 | 2/2008 | Khan et al. | |
| 2008/0059464 A1 | 3/2008 | Law et al. | |
| 2008/0071781 A1 | 3/2008 | Ninan et al. | |
| 2008/0101371 A1 | 5/2008 | Law et al. | |
| 2008/0263665 A1 | 10/2008 | Ma et al. | |
| 2009/0037379 A1 | 2/2009 | Bou-Diab et al. | |
| 2009/0119399 A1 | 5/2009 | Hussain et al. | |
| 2009/0138440 A1 | 5/2009 | Goyal et al. | |
| 2009/0138494 A1 | 5/2009 | Goyal et al. | |
| 2009/0228474 A1 | 9/2009 | Chiu et al. | |
| 2010/0114973 A1 | 5/2010 | Goyal | |
| 2013/0262518 A1 | 10/2013 | Goyal | |
| 2014/0032607 A1 | 1/2014 | Hussain et al. | |
| 2014/0324900 A1 | 10/2014 | Hussain et al. | |
| 2014/0337387 A1 | 11/2014 | Hussain et al. | |

FOREIGN PATENT DOCUMENTS

| | | |
|---|---|---|
| WO | WO 2006/031659 A2 | 3/2006 |
| WO | WO 2009/070191 A1 | 6/2009 |
| WO | WO 2009/070192 A1 | 6/2009 |

OTHER PUBLICATIONS

Anonymous, Graph (data structure) [online] Oct. 2007 [retrieved on Oct. 3, 2007] Retrieved from the Internet URL: http://en.wikipedia.org/w/index.php?title=graph_(data structure) &o . . . .

Bradley, Tony, "Introduction to Intrusion Detection Systems (IDS)," http://netsecurity.about.com/cs/hackertools/a/aa030504.htm and http://searchsecurity.techtarget.com/sDefinition/0,,sid14_gci295031,00.html_(Jan. 11, 2005).

Candan et al., "Afilter: Adaptable XML Filtering with Prefix-Caching and Suffix-Caching," VLDB '06 Sep. 12-15, 2006, Seoul, Korea, pp. 559-570.

Ciura et al., "How to Squeeze a Lexicon," Software—Practice and Experience 2001; 31(11):1-11.

Ciura, et al., Software-Practice and Experience, 31:1007-1090, 2001.

Daciuk, J. "Experiments with Automata Compression," Database Inspec [online] The Institution of Electrical Engineers, GB (2000) and Proceedings of Fifth International Conference on Implementation and Application of Automata: 113-119 (Jul. 24, 2000-Jul. 25, 2000).

Dharmapurikar, et al., "Design and Implementation of a String Matching System for Network Intrusion Detection using FPGA-based Bloom Filters," *Washington University Dept. of Computer Science and Engineering*: Technical Report WUCS—2004-012 (2004).

Du, A-Ning, et al., "Comparison of Stringmatching Algorithms: an Aid to Information Content Security," *Machine Learning and Cybernetics*, 2003 International Conference, 5:2996-3001, Nov. 2-5, 2003. DOI: 10.1109/ICMLC.2003.1260090.

European Examination Report for European Application No. 05812863.8, mailed May 14, 2008.

Fisk, M. and Varghese, G., "Fast Content-Based Packet Handling for Intrusion Detection," *UCSD Technical Report*, CS2001-0670 (2001).

International Preliminary Report on Patentability and Written Opinion, PCT/US2008/011545, mailed Jun. 10, 2010.

International Preliminary Report on Patentability and Written Opinion for PCT/US2008/011543, mailed Jun. 10, 2010.

International Preliminary Report on Patentability for PCT/US2005/032236; Date Mailed: Mar. 13, 2007.

International Search Report from PCT/US2008/011543 mailed on Mar. 2, 2009.

International Search Report from PCT/US2008/011545 mailed on Mar. 2, 2009.

International Search Report, PCT/US2005/032236, mailed May 16, 2006.

(56) References Cited

OTHER PUBLICATIONS

Lazzara, G., "Automata and performances", Technical Report, XP007921508, 130 pgs. (Jun. 2006).

McConnell, S., "Who Needs Software Engineering?," *IEEE Software*, 18(1):5-8 (Jan./Feb. 2001). DOI: 10.1109/MS.2001.903148.

Melvin, S., et al., "A Massively Multithreaded Packet Processor," Paper presented at NP2: Workshop on Network Processors, held in conjunction with *The 9th International Symposium on High-Performance Computer Architecture*, Anaheim, CA (Feb. 2003).

Mertz, David, "*Learning to Use Regular Expressions, Introduction to the Tutorial*," Gnosis Software, http://gnosis.cx/publish/programming/regular_expressions.html, pp. 1-16, downloaded Jan. 11, 2005.

Rafig, A.N.M. Ehtesham, et al., "A Fast String Search Algorithm for Deep Packet Classification," *Computer Communications*, 27(15):1524-1538 (Sep. 2004). DOI: 10.1016/j.comcom.2004.06.005.

Ramakrishnan, et al., Proceedings of the 2006 Conference on Emperical Methods in Natural Language Processing (EMNLP 2006), pp. 492-500, Sydney, Jul. 2006).

Schuehler, David V., et al, "Architecture for a Hardware-Based, TCIP/IP Content-Processing System," *IEEE Computer Society*, pp. 62-69 (Jan.-Feb. 2004).

Tanenbaum, A., "Structured Computer Organization," ($2^{nd}$ Ed.), Prentice-Hall, Inc., Upper Saddle River, NJ, 1984.

Tewari, et al., A Parallel DFA Minimization Algorithm, S. Sahni, et al. (Eds.) HiPC 2002, LNCS 2552, pp. 31-40, 2002.

Vahid, F., "The Softening of Hardware," *Computer*, 36(4):27-34 (Apr. 2003). DOI: 10.1109/MC.2003.1193225.

Written Opinion for PCT/US2008/011545 mailed on Mar. 2, 2009.

Written Opinion of the International Searching Authority, PCT/US2005/032236, mailed May 16, 2006.

Yu, F., et al., "Gigabit Rate Packet Pattern Matching Using Team," *ICNP*, 2004.

\* cited by examiner

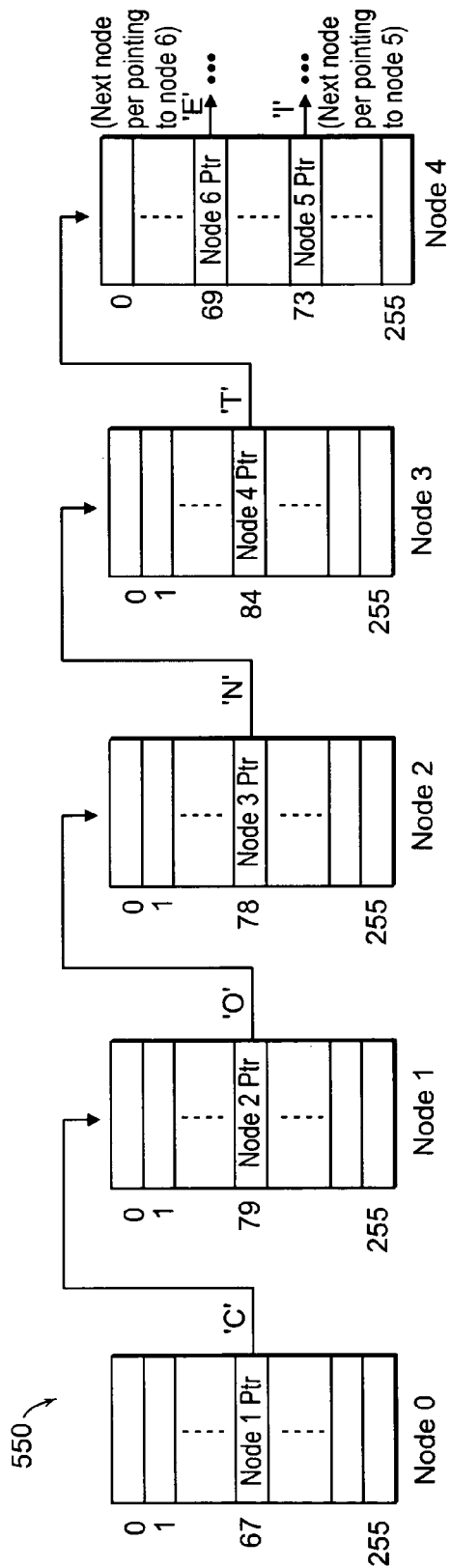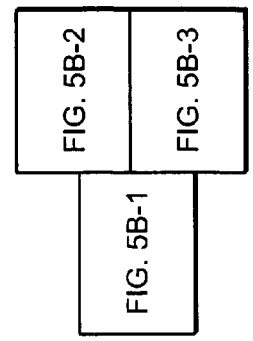
FIG. 5B-1
FIG. 5B

Node Structure looks like:

typedef struct { ← 505
  ARC arcs[256];
} Node:

typedef struct { ← 507
  uint32_t flags :m;
  uint32_t arc_ptr :n;
  uint32_t reserved :o;
} ARC ;

Value of m, n & o will depend on implementation. m+n+o = 32.

Size of each ARC is 32 bits i.e. 1 word.

Basic walker logic:

1) get root node pointer and assign it to 'node_ptr';
    2) read next input character and assign its ascii value to 'ch';
    3) if (end of input stream)
        go to step 8
    4) Use 'ch' to index into 'node_ptr' and get arc for this character. i.e.
        arc = node_ptr[ch]; or
        arc = node_ptr + (ch * size of (ARC));
    5) Check flags of arc. i.e. whether next node is match node or marked node
      or some special node. Accordingly generate result.
    6) Extract next node ptr from arc and assign it to 'node_ptr'.
    7) Go to step 2.
    8) Finish.

FIG. 5C

Node Structure looks like:

```
typedef struct {
    ARC arcs[];
} Node;

typedef struct {
    uint64_t ch :x ;
    uint64_t hash :y ;          /—905
    uint32_t flags :m;
    uint32_t arc_ptr :n;
    uint32_t reserved :o ;
} ARC ;
```

Value of x, y, m, n & o will depend on implementation. x+y+m+n+o = 64.

Size of each ARC is 64 bits i.e. 1 double word. Based on implementation, it can be 1 word as well i.e. 32 bits.

Basic walker logic:

1) get root node pointer and assign it to 'node_ptr';
2) get root hash function and assign it to 'hash_fn';
3) read next input character and assign its ascii value to 'ch';
4) if (end of input stream)
      go to step 13
5) Use 'hash_fn' to generate hash index for 'ch' and assign to 'index'. Use this index to get potential arc for this character. i.e.
      arc = node_ptr[index]; or
      arc = node_ptr + (index * size of (ARC));
6) Extract actual character stored in the arc and assign to 'arc_ch'.
7) Check if 'ch' is same as 'arc_ch'.
8) If yes.
      then go to step 9
      else go to step 1
9) Check flags of arc. i.e. whether next node is match node or marked node or some special node. Accordingly generate result.
10) Extract next node ptr from arc and assign it to 'node_ptr'.
11) Extract hash function of next node from arc and assign it to 'hash_fn'.
12) Go to step 3.
13) Finish.

FIG. 9

| NODAL BIT MAP | | |
|---|---|---|
| ASCII VALUE | ASCII CHARACTER | INDICATION VALUE |
| 65 | 'A' | 0 |
| 69 | 'E' | 0 |
| 78 | 'N' | 1 |
| 82 | 'R' | 0 |
| 83 | 'S' | 0 |
| 84 | 'T' | 0 |
| 85 | 'U' | 0 |
| 88 | 'X' | 1 |

NODAL BIT MAP
(4-to-1 MAPPING)

150B

| Index | ASCII Characters | Indication Value |
|---|---|---|
| 0 | 'NUL'  'SOH'  'STX'  'ETX' | 0 |
| 1 | 'EOT'  'END'  'ACK'  'BEL' | 0 |
| ⋮ | ⋮ | ⋮ |
| 16 | '@'  'A'  'B'  'C' | 0 |
| 17 | 'D'  'E'  'F'  'G' | 0 |
| 18 | 'H'  'I'  'J'  'K' | 0 |
| 19 | 'L'  'M'  'N'  'O' | 1 |
| 20 | 'P'  'Q'  'R'  'S' | 0 |
| 21 | 'T'  'U'  'V'  'W' | 0 |
| 22 | 'X'  'Y'  'Z'  '[' | 1 |
| 23 | '\'  ']'  '^'  '_' | 0 |
| ⋮ | ⋮ | ⋮ |
| 30 | 'x'  'y'  'z'  '{' | 0 |
| 31 | '|'  '}'  '~'  'DEL' | 0 |
| ⋮ | ⋮ | ⋮ |

FIG. 12

| ASCII Index | LOCATION | ASCII Index | LOCATION | ASCII Index | LOCATION | ASCII Index | LOCATION |
|---|---|---|---|---|---|---|---|
| 0 | 0 | 58 | 9 | 90 | 20 | 122 | 30 |
| 1 | 0 | 59 | 9 | 91 | 20 | 123 | 31 |
| 2 | 0 | 60 | 10 | 92 | 20 | 124 | 31 |
| 3 | 0 | 61 | 10 | 93 | 21 | 125 | 31 |
| ⋮ | 0 | 62 | 10 | 94 | 21 | 126 | 33 |
| 31 | 0 | 63 | 11 | 95 | 21 | 127 | 33 |
| 32 | 0 | 64 | 11 | 96 | 22 | 128 | 33 |
| 33 | 1 | 65 | 11 | 97 | 22 | 129 | 33 |
| 34 | 1 | 66 | 12 | 98 | 22 | 130 | 33 |
| 35 | 1 | 67 | 12 | 99 | 23 | 131 | 33 |
| 36 | 2 | 68 | 12 | 100 | 23 | 132 | 33 |
| 37 | 2 | 69 | 13 | 101 | 23 | 133 | 33 |
| 38 | 2 | 70 | 13 | 102 | 24 | 134 | 33 |
| 39 | 3 | 71 | 13 | 103 | 24 | 135 | 33 |
| 40 | 3 | 72 | 14 | 104 | 24 | 136 | 33 |
| 41 | 3 | 73 | 14 | 105 | 25 | 137 | 33 |
| 42 | 4 | 74 | 14 | 106 | 25 | 138 | 33 |
| 43 | 4 | 75 | 15 | 107 | 25 | 139 | 33 |
| 44 | 4 | 76 | 15 | 108 | 26 | 140 | 33 |
| 45 | 5 | 77 | 15 | 109 | 26 | 141 | 33 |
| 46 | 5 | 78 | 16 | 110 | 26 | 142 | 33 |
| 47 | 5 | 79 | 16 | 111 | 27 | 143 | 33 |
| 48 | 6 | 80 | 16 | 112 | 27 | 144 | 33 |
| 49 | 6 | 81 | 17 | 113 | 27 | 145 | 33 |
| 50 | 6 | 82 | 17 | 114 | 28 | 146 | 33 |
| 51 | 7 | 83 | 17 | 115 | 28 | 147 | 33 |
| 52 | 7 | 84 | 18 | 116 | 28 | 148 | 33 |
| 53 | 7 | 85 | 18 | 117 | 29 | 149 | 33 |
| 54 | 8 | 86 | 18 | 118 | 29 | 150 | 33 |
| 55 | 8 | 87 | 19 | 119 | 29 | 151 | 33 |
| 56 | 8 | 88 | 19 | 120 | 30 | ⋮ | 33 |
| 57 | 9 | 89 | 19 | 121 | 30 | 255 | 33 |

FIG. 13

NODAL BIT MAP 150C

| Index | ASCII Characters | ASCII Value | Indication value |
|---|---|---|---|
| 0 | non-printable characters printable non-alphanumerical characters numerical characters non-expression alpha characters and extended ASCII characters | 0-66, 68, 70-77, 80-82, 85-87, 89-255 | 0 |
| 1 | 'C' | '67' | 0 |
| 2 | 'E' | '69' | 0 |
| 3 | 'I' | '73' | 0 |
| 4 | 'M' | '77' | 0 |
| 5 | 'N' | '78' | 1 |
| 6 | 'O' | '79' | 0 |
| 7 | 'S' | '83' | 0 |
| 8 | 'T' | '84' | 0 |
| 9 | 'U' | '85' | 0 |
| 10 | 'X' | '112-115' | 1 |

FIG. 14

GLOBAL LOOK-UP TABLE

| ASCII Value | ASCII Character | Index Value | ASCII Value | ASCII Character | Index Value | ASCII Value | ASCII Character | Index Value |
|---|---|---|---|---|---|---|---|---|
| 0 | NUL | 0 | 66 | 'B' | 0 | 87 | 'W' | 0 |
| 1 | SOH | 0 | 67 | 'C' | 1 | 88 | 'X' | 10 |
| 2 | STX | 0 | 68 | 'D' | 0 | 89 | 'Y' | 0 |
| ... | ... | ... | 69 | 'E' | 2 | 90 | 'Z' | 0 |
| 32 | SPACE | 0 | 70 | 'F' | 0 | 91 | '[' | 0 |
| 33 | '!' | 0 | 71 | 'G' | 0 | 92 | '\' | |
| 34 | '"' | 0 | 72 | 'H' | 3 | 93 | ']' | 0 |
| 35 | '#' | 0 | 73 | 'I' | 0 | ... | ... | 0 |
| ... | ... | ... | 74 | 'J' | 0 | 109 | 'm' | 0 |
| 45 | '-' | 0 | 75 | 'K' | 4 | 110 | 'n' | 0 |
| 46 | '.' | 0 | 76 | 'L' | 5 | 111 | 'o' | 0 |
| 47 | '/' | 0 | 77 | 'M' | 6 | 112 | 'p' | 0 |
| 48 | '0' | 0 | 78 | 'N' | 0 | 115 | 's' | 0 |
| 49 | '1' | 0 | 79 | 'O' | 0 | 116 | 't' | 0 |
| ... | ... | ... | 80 | 'P' | 0 | 117 | 'u' | 0 |
| 57 | '9' | 0 | 81 | 'Q' | 7 | ... | ... | 0 |
| 58 | ':' | 0 | 82 | 'R' | 8 | 122 | 'z' | 0 |
| 59 | ';' | 0 | 83 | 'S' | 9 | 123 | '{' | 0 |
| ... | ... | ... | 84 | 'T' | 0 | ... | ... | 0 |
| 64 | '@' | 0 | 85 | 'U' | 0 | 126 | '~' | 0 |
| 65 | 'A' | 0 | 86 | 'V' | 0 | 127 | DEL | 0 |
| | | | | | | 128 | ○ | 0 |
| | | | | | | ... | ... | |
| | | | | | | 255 | □ | 0 |

FIG. 15

```
typedef struct {
    ARC(' arcs[].// indexed using hash (character);     }251
} Node
typedef struct {
    uint64_t ch :x :
    uint64_t hash :y :
    uint64_t flags :m :                                 }253
    uint64_t arc_ptr :n:
    uint64_t next_node_structural_config_bitmap :0:
} ARC :
typedef struct {
    uint8_t bit_position {256}:      }255
} GLOBAL_LOOkUP_TABLE
```

Basic walker logic:

1) get root node pointer and assign it to 'node_ptr':
2) get root hash function and assign it to 'hash_fn':
3) read next input character and assign its ascii value to 'ch1'
4) read next next input character and assign its ascii value to 'ch2'
5) if (end of input stream)
   go to step 19
6) Use 'hash_fn' to generate hash index for 'ch1' and assign to 'index'.Use this index to get potential arc for this character. i.e.
   arc = node_ptr[index]; or
   arc = node_ptr + (index*sizeot(ARC))
7) Extract actual character stored in the arc and assign to 'arc_ch'
8) Check it' ch)' is same as 'arc_ch'
9) If yes,
   then go to step 10
       else go to step 1 (and rescan same character stored in 'ch1'. i.e. decrement 'input_ptr' by 1)
10) Check flags of arc. i.e. whether next node is match node or marked node or some special node. Accordingly generate result.
11) Extract next_node_structual_config_bitmap and assign to 'structure_hint;.
12) Do a lookup in GLOBAL_LOOKUP_TABLE using 'ch2' and asign value to 'v' index'.
13) Extract bit value from 'indication value' at location 'v_index' and assign to 'bit_value'.
14) If 'bit_value' is 1, Goto step 16.
15) Else if 'bit_value' is 0, Goto step 1 (dampen_memory_access)
16) Extract next node ptr from arc and assign it to 'node_ptr'.
17) Extract hash function of next node from arc and assign it to 'hash_fn'.
18) Go to step 3
19) Finish.

TRAVERSAL WITH ARC CONFIGURATION INFORMATION

RELATED APPLICATIONS

This application is a continuation of U.S. Application No. 13,905,711, filed May 30, 2013, which is a continuation of U.S. application Ser. No. 12/277,129, filed Nov. 24, 2008, now U.S. Pat. No. 8,473,523, which claims the benefit of U.S. Provisional Application No. 61/196,717, filed Oct. 31, 2008. The entire teachings of the above applications are incorporated herein by reference.

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Network processors are available for high-throughput L2 and L3 network protocol processing, that is, performing packet processing to forward packets at wire-speed. Typically, a general purpose processor is used to process L4-L7 network protocols that require more intelligent processing. Although a general purpose processor can perform the compute intensive tasks, it does not provide sufficient performance to process the data so that it can be forwarded at wire-speed.

Content aware networking requires inspection of the contents of packets at "wire speed." The content may be analyzed to determine whether there has been a security breach or an intrusion. A large number of patterns and rules in the form of regular expressions are applied to ensure that all security breaches or intrusions are detected. A regular expression is a compact method for describing a pattern in a string of characters. The simplest pattern matched by a regular expression is a single character or string of characters, for example, /c/ or /cat/. The regular expression also includes operators and meta-characters that have a special meaning.

Through the use of meta-characters, the regular expression can be used for more complicated searches such as, "abc*xyz". That is, find the string "abc", followed by the string "xyz", with an unlimited, or zero, number of characters in-between "abc" and "xyz". Another example is the regular expression "abc??abc*xyz;" that is, find the string "abc," followed two characters later by the string "abc" and an unlimited, or zero, number of characters later by the string "xyz."

An Intrusion Detection System (IDS) application inspects the contents of all individual packets flowing through a network, and identifies suspicious patterns that may indicate an attempt to break into or compromise a system. One example of a suspicious pattern may be a particular text string in a packet followed 100 characters later by another particular text string.

Content searching is typically performed using a search algorithm such as Deterministic Finite Automata (DFA) to process the regular expression. The DFA processes an input stream of characters sequentially using a DFA graph and makes a state transition based on the current character and state.

SUMMARY

Typically, a design trade-off must be made in the implementation of DFA graph search systems. The trade-off is between creating a compressed DFA graph which may comprise a lower memory requirement for storage, but may require multiple (more than one) external memory accesses for each input character processed.

Alternatively, a larger DFA graph may be utilized that may require only a single memory access per character, but at the cost of a large memory requirement for storage. The tradeoff is between graph size (memory) requirement and processing time.

In an example embodiment, a compressed DFA graph is presented which achieves the best of both worlds (i.e., provides a reduced graph size and a lesser processing time). The compressed DFA graph will not only comprise a low memory requirement, but will also reduce the number of memory accesses associated with the processing of an input stream. In an example embodiment, the number of memory accesses are reduced even less than required for processing an input stream using equivalent (i.e., for the same searchable expressions) larger DFA graphs.

In an example embodiment, a system and corresponding method for traversing and generating a compressed DFA is presented. A system may include a walker process configured to traverse a searchable graph, the graph including a plurality of interconnected nodes, where at least one node includes at least one valid arc. The system may also include a bit map stored in a valid arc, associated with a prior node, the bit map providing structural information of a current node to which the valid arc points.

The bit map may feature a one-to-one mapping and include a listing of indicator values, with each indicator value associated with a respective ASCII character. Each indicator value may provide an indication of whether a valid arc associated with a respective ASCII character exists in the current node. An indicator value may be negative if the associated valid arc does not exist in the current node, or an indicator value may be positive if the associated valid arc does exist in the current node.

The bit map may feature N-to-1 mapping and include a listing of indicator values, with each indicator value associated with a respective range of ASCII characters. Each indicator value may provide an indication of whether at least one valid arc associated with respective ASCII character in the respective range exists in the current node. An indicator value may be negative if all valid arcs in the respective range does not exist in the current node, or an indicator value may be positive if at least one valid arc in the respective range exists in the current node.

The walker process may be further configured to retrieve the valid arc associated with a current character of the input stream in a prior node. The walker process may also be configured to read the bit map stored in the valid arc and determine the indicator value associated with a next character in the input stream. The walker process may access in memory the next valid arc associated with the next character if the indicator value is positive. The walker processor may be configured to return to a root node, or a designated node, if the indicator value is negative. The address of the root or designated node may be stored in the valid arc pointing to the current node.

If the nodal bit map features N-to-1 mapping and is uniform, where each respective range of the bit map has an equal number of associated ASCII characters, the walker process may determine the location of the indicator value associated with the next character via an integer division of the ASCII numerical value associated with the next character by the number of characters included in each range.

If the nodal bit map features a non-uniform N-to-1 mapping scheme, a global look-up table may be used to provide location information of an indicator value associated with the next character. The global look-up table may be stored in on-chip cache.

The global look-up table may be constructed as a function of ASCII characters included in searchable expressions used in creating the DFA graph. An index, in the nodal bit map, may be assigned for all ASCII characters, not included in the searchable expressions in a fixed or invalid value. The indicator value associated with the next character is negative if the character is associated with an invalid value, or a value not included in the nodal bit map (i.e., an index greater than the size of the nodal bit map). The indicator value may further be determined if the character is associated with a fixed value, by defining a pre-set in the walker process.

Index values may also be defined with the use of weights. A weight of a character may be determined as a function of a frequency the character appears in searchable expressions, or as a function of prior knowledge of a likelihood of a frequency the character will appear in an input stream.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5C is an example of pseudo code used to control a walker process traversing the DFA graph of FIGS. 5B(1)-5B(3);

FIG. 9 is an example of pseudo code used to control a walker process of the example of FIG. 8;

FIG. 12 is an illustrative example of the nodal bit map of FIG. 10 featuring a four-to-one mapping scheme;

FIG. 13 is an illustrative example of a global look-up table featuring a non-uniform mapping scheme;

FIG. 14 is an illustrative example of the nodal bit map of FIG. 10 featuring a non-uniform mapping scheme;

FIG. 15 is an illustrative example of a global look-up table featuring the non-uniform mapping scheme of FIG. 14;

FIG. 16 is an example of pseudo code used to control a walker process of the example in FIG. 15;

FIG. 18 is an example of the nodal bit maps of FIG. 17.

DETAILED DESCRIPTION

Figure 1A:
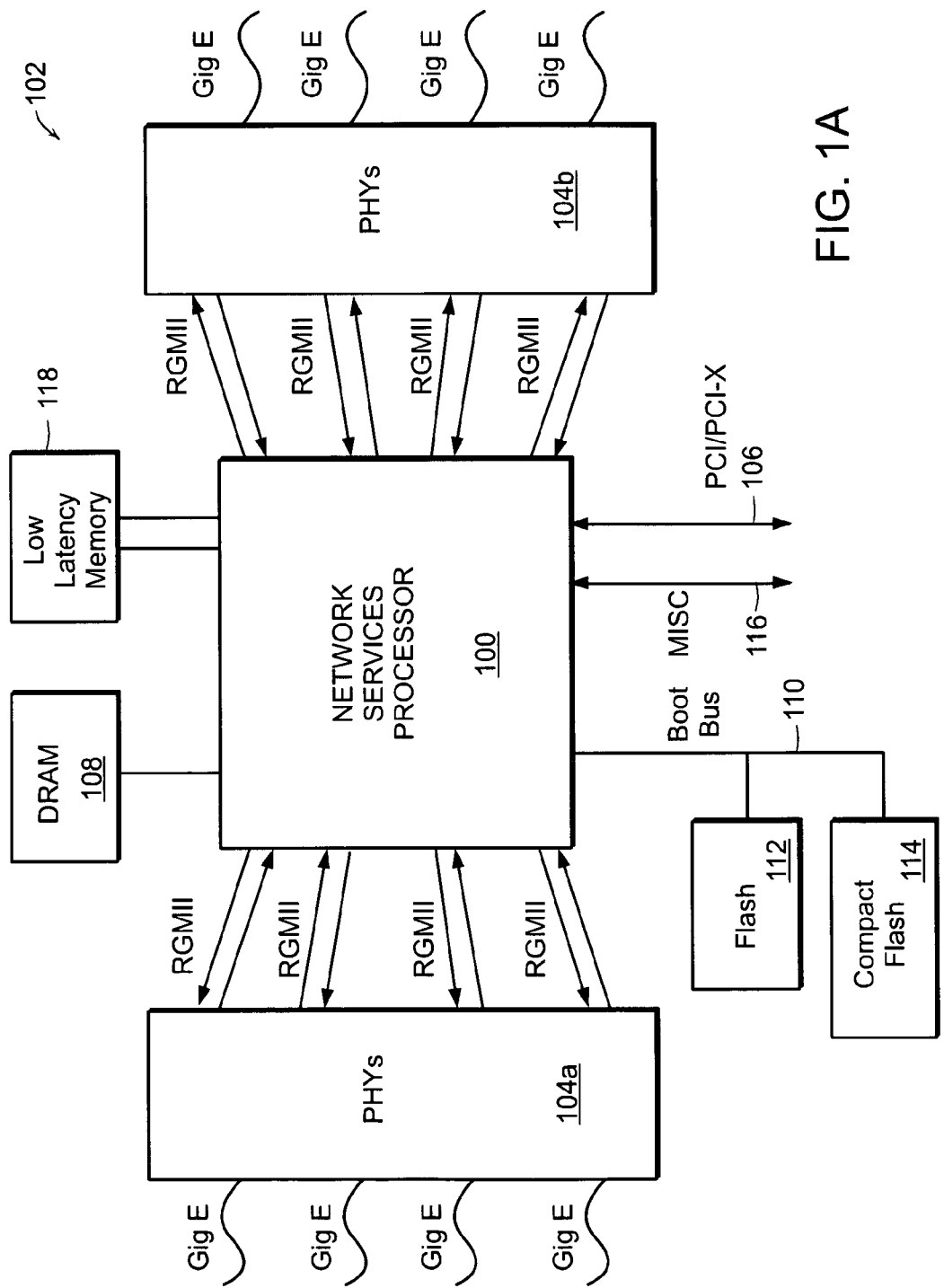
FIGS. 1A and 1B are block diagrams of a security appliance including a network services processor and a protocol processor, respectively.

FIG. 1A is a block diagram of an example security appliance 102 including a network services processor 100. The security appliance 102 may be a standalone system that may switch packets received at one Ethernet port (Gig E) to another Ethernet port (Gig E) and perform a plurality of security functions on received packets prior to forwarding the packets. For example, the security appliance 102 may be used to perform security processing on packets received on a Wide Area Network prior to forwarding the processed packets to a Local Area Network.

The network services processor 100 processes Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

The network services processor 100 may include a plurality of Ethernet Media Access Control interfaces with standard Reduced Gigabyte Media Independent Interface (RGMII) connections to the off-chip PHYs 104a, 104b.

The network services processor 100 may also receive packets from the Ethernet ports (Gig E) through the physical interfaces PHY 104a, 104b, and perform L7-L2 network protocol processing on the received packets and forwards processed packets through the physical interfaces 104a, 104b to another hop in the network or the final destination or through the PCI bus 106 for further processing by a host processor. The network protocol processing may include processing of network security protocols such as Firewall, Application Firewall, Virtual Private Network (VPN) including IP Security (IPSec) and/or Secure Sockets Layer (SSL), Intrusion Detection System (IDS) and Anti-virus (AV).

The network services processor 100 may also include a low latency memory controller for controlling low latency Dynamic Random Access Memory (DRAM) 118. The low latency DRAM 118 may be used for Internet Services and Security applications allowing fast lookups, including the string-matching that may be required for Intrusion Detection System (IDS) or Anti Virus (AV) applications and other applications that require string matching.

The network services processor 100 may perform pattern search, regular expression processing, content validation, transformation and security accelerate packet processing according to an example embodiment. The regular expression processing and pattern search may be used to perform string matching for AV and IDS applications and other applications that require string matching.

A DRAM controller in the network services processor 100 may control access to an external Dynamic Random Access Memory (DRAM) 108 that is coupled to the network services processor 100. The DRAM 108 may store data packets received from the PHYs interfaces 104a, 104b or the Peripheral Component Interconnect Extended (PCI-X) interface 106 for processing by the network services processor 100. In one embodiment, the DRAM interface supports 64 or 128 bit Double Data Rate II Synchronous Dynamic Random Access Memory (DDR II SDRAM) operating up to 800 MHz. The DRAM may also store rules data required for lookup and pattern matching in DFA graph expression searches.

A boot bus 110 may provide the necessary boot code which may be stored in flash memory 112 and may be executed by the network services processor 100 when the network services processor 100 is powered-on or reset. Application code may also be loaded into the network services processor 100 over the boot bus 110, from a device 114 implementing the Compact Flash standard, or from another high-volume device, which can be a disk, attached via the PCI bus.

The miscellaneous I/O interface 116 offers auxiliary interfaces such as General Purpose Input/Output (GPIO), Flash, IEEE 802 two-wire Management Data Input/Output Interface (MDIO), Universal Asynchronous Receiver-Transmitters (UARTs) and serial interfaces.

Figure 1B:
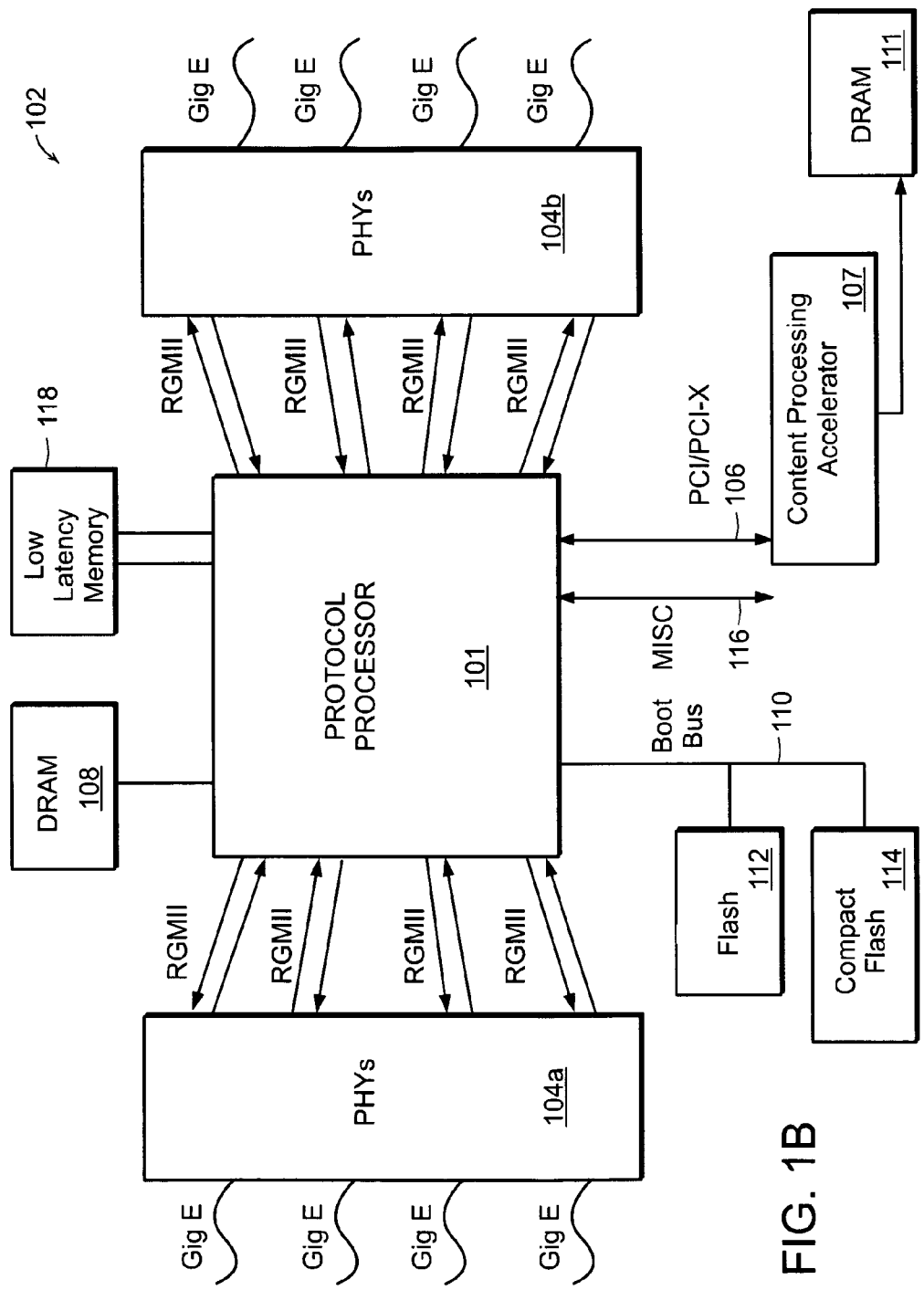

It should be appreciated that the example security appliance 102 may alternatively include a protocol processor 101 (FIG. 1B). The protocol processor 101 may include the element of the network services processor 100 with the addition of a content processing accelerator 107, connected to the processor 101 via the PCI/PCI-X connection 106, and an external DRAM 111 connected to the accelerator 107. The accelerator 107 and DRAM 111 may be employed in content search applications, therefore making all content searching operations external to the processor 101.

Figure 2:
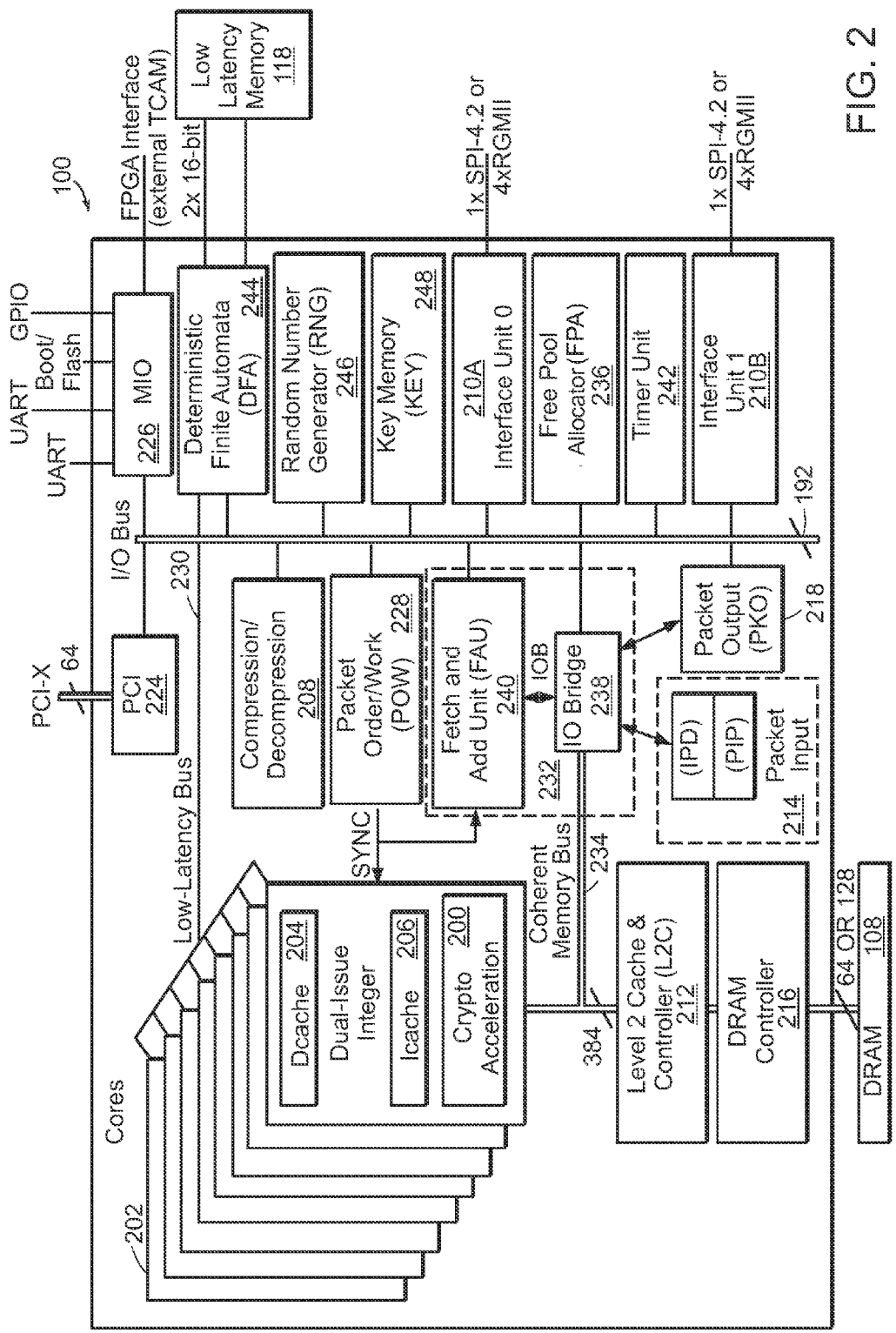
FIG. 2 is a block diagram of the network services processor shown in FIG. 1A.

FIG. 2 is a block diagram of the network services processor 100, or the protocol processor 101 shown in FIGS. 1A and 1B, respectively. The network services processor 100, and/or the protocol processor 101, delivers high application performance using a plurality of processors (cores) 202 located on a L1 network protocol. Network applications may be categorized into data plane and control plane operations. Each of the cores 202 may be dedicated to performing data plane or control plane operations. A data plane operation may include packet operations for forwarding packets. A control plane operation may include processing of portions of complex higher level protocols such as Internet Protocol Security (IPSec), Transmission Control Protocol (TCP) and Secure Sockets Layer (SSL). A data plane operation may include processing of other portions of these complex higher level protocols.

A packet may be received by any one of the interface units 210a, 210b through a SPI-4.2 or RGMII interface. A packet may also be received by the PCI interface 224. The interface unit 210a, 210b handles L2 network protocol pre-processing of the received packet by checking various fields in the L2 network protocol header included in the received packet. After the interface unit 210a, 210b has performed L2 network protocol processing, the packet is forwarded to the packet input unit 214. The packet input unit 214 may perform pre-processing of L3 and L4 network protocol headers included in the received packet. The pre-processing includes checksum checks for Transmission Control Protocol (TCP)/User Datagram Protocol (UDP) (L3 network protocols).

The packet input unit 214 may write packet data into buffers in Level 2 cache 212 or DRAM 108 in a format that is convenient to higher-layer software executed in at least one processor 202 for further processing of higher level network protocols. The packet input unit 214 may also support a programmable buffer size and can distribute packet data across multiple buffers to support large packet input sizes.

The Packet order/work (POW) module (unit) 228 may queue and schedule work (packet processing operations) for the processor 202. Work is defined to be any task to be performed by a processor that is identified by an entry on a work queue. The task can include packet processing operations, for example, packet processing operations for L4-L7 layers to be performed on a received packet identified by a work queue entry on a work queue. Each separate packet processing operation is a piece of the work to be performed by a processor on the received packet stored in memory (L2 cache memory 212 or DRAM 108). For example, the work may be the processing of a received Firewall/Virtual Private Network (VPN) packet. The processing of a Firewall/VPN packet may include the following separate packet processing operations (pieces of work): (1) defragmentation to reorder fragments in the received packet; (2) IPSec decryption; (3) IPSec encryption; and (4) Network Address Translation (NAT) or TCP sequence number adjustment prior to forwarding the packet.

The network services processor 100, and/or the protocol processor 101, may also include a memory subsystem. The memory subsystem may include level 1 data cache memory 204 in each processor 202, instruction cache in each processor 202, level 2 cache memory 212, a DRAM controller 216 for external DRAM memory and the interface 230 to external low latency memory 118. The memory subsystem is architected for multi-processor support and tuned to deliver both high-throughput and low-latency required by memory intensive content networking applications. Level 2 cache memory 212 and external DRAM memory 108 (FIGS. 1A and 1B) may be shared by all of the processors 202 and I/O co-processor devices.

The network services processor 100, and/or the protocol processor 101, may also include application specific co-processors that offload the processors 202 so that the network services processor achieves high-throughput. The application specific co-processors include a DFA co-processor 244 that performs Deterministic Finite Automata (DFA)

and a compression/decompression co-processor 208 that performs compression and decompression.

Each processor 202 may be a dual-issue, superscalar processor with instruction cache 206, Level 1 data cache 204, built-in hardware acceleration (crypto acceleration module) 200 for cryptography algorithms with direct access to low latency memory over the low latency memory bus 230. The low-latency direct-access path to low latency memory 118 bypasses the L2 cache memory 212 and can be directly accessed from both the processors (cores) 202 and a DFA co-processor 244. In one embodiment, the latency to access the low-latency memory is less than 40 milliseconds.

Prior to describing the operation of the content search macros used for regular expression processing and pattern search in further detail, the other modules in the network services processor 100 will be described. In an example, after the packet has been processed by the processors 202, a packet output unit (PKO) 218 reads the packet data from L2 cache or DRAM, performs L4 network protocol post-processing (e.g., generates a TCP/UDP checksum), forwards the packet through the interface unit 210a, 210b and frees the L2 cache 212 or DRAM 108 locations used to store the packet.

Each processor 202 is coupled to the L2 cache by a coherent memory bus 234. The coherent memory bus 234 is the communication channel for all memory and I/O transactions between the processors 202, an I/O Bridge (IOB) 232 and the Level 2 cache and controller 212.

A Free Pool Allocator (FPA) 236 maintains pools of pointers to free memory in level 2 cache memory 212 and DRAM 108. A bandwidth efficient (Last In First Out (LIFO)) stack is implemented for each free pointer pool. If a pool of pointers is too large to fit in the Free Pool Allocator (FPA) 236, the Free Pool Allocator (FPA) 236 builds a tree/list structure in level 2 cache 212 or DRAM 108 using freed memory in the pool of pointers to store additional pointers.

The I/O Bridge (IOB) 232 manages the overall protocol and arbitration and provides coherent I/O partitioning. The IOB 232 includes a bridge 238 and a Fetch and Add Unit (FAU) 240. The bridge 238 includes buffer queues for storing information to be transferred between the I/O bus, coherent memory bus, the packet input unit 214 and the packet output unit 218.

The Fetch and Add Unit (FAU) 240 is a 2 KB register file supporting read, write, atomic fetch-and-add, and atomic update operations. The Fetch and Add Unit (FAU) 240 can be accessed from both the processors 202 and the packet output unit 218. The registers store highly-used values and thus reduce traffic to access these values. Registers in the FAU 240 are used to maintain lengths of the output queues that are used for forwarding processed packets through the packet output unit 218.

The PCI interface controller 224 has a DMA engine that allows the processors 202 to move data asynchronously between local memory in the network services processor and remote (PCI) memory in both directions.

Typically, content aware application processing utilizes a deterministic finite Automata (DFA) to recognize a pattern in the content of a received packet. The DFA is a finite state machine, that is, a model of computation including a set of states, a start state, an input alphabet (set of all possible symbols) and a transition function that maps input symbols and current states to a next state. Computation begins in the start state and changes to new states dependent on the transition function. The DFA is deterministic, that is, the behavior can be completely predicted from the input. The pattern is a finite number of strings of characters (symbols) to search for in the input stream (string of characters).

The pattern is commonly expressed using a regular expression that includes atomic elements, for example, normal text characters such as, A-Z, 0-9 and meta-characters such as, *, ^ and |. The atomic elements of a regular expression are the symbols (single characters) to be matched. These are combined with meta-characters that allow concatenation (+) alternation (|), and Kleene-star (*). The meta-character for concatenation is used to create multiple character matching patterns from a single character (or sub-strings) while the meta-character for alternation (|) is used to create a regular expression that can match any of two or more sub-strings. The meta-character Kleene-star (*) allows a pattern to match any number, including no occurrences of the preceding character or string of characters. Combining different operators and single characters allows complex expressions to be constructed. For example, the expression (th(is|at)*) will match the following character strings: th, this, that, thisis, thisat, thatis, or thatat.

The character class construct [ . . . ] allows listing of a list of characters to search for, e.g. gr[ea]y looks for both grey and gray. A dash indicates a range of characters, for example, [A-Z]. The meta-character "." matches any one character.

The input to the DFA state machine is typically a string of (8-bit) bytes, that is, the alphabet is a single byte (one character or symbol). Each byte in the input stream results in a transition from one state to another state.

The states and the transition functions can be represented by a graph, where each node in the graph represents a state and arcs in the graph represent state transitions. The current state of the state machine is represented by a node identifier that selects a particular graph node. The graph may be stored in low latency memory 118, or the main DRAM 108, and accessed by the processors 202 over the low latency bus. The processors 202 may access a DFA-based graph stored in the low latency memory, or the main DRAM 108, directly. The graph will be described later in conjunction with FIG. 5A.

Figure 3:
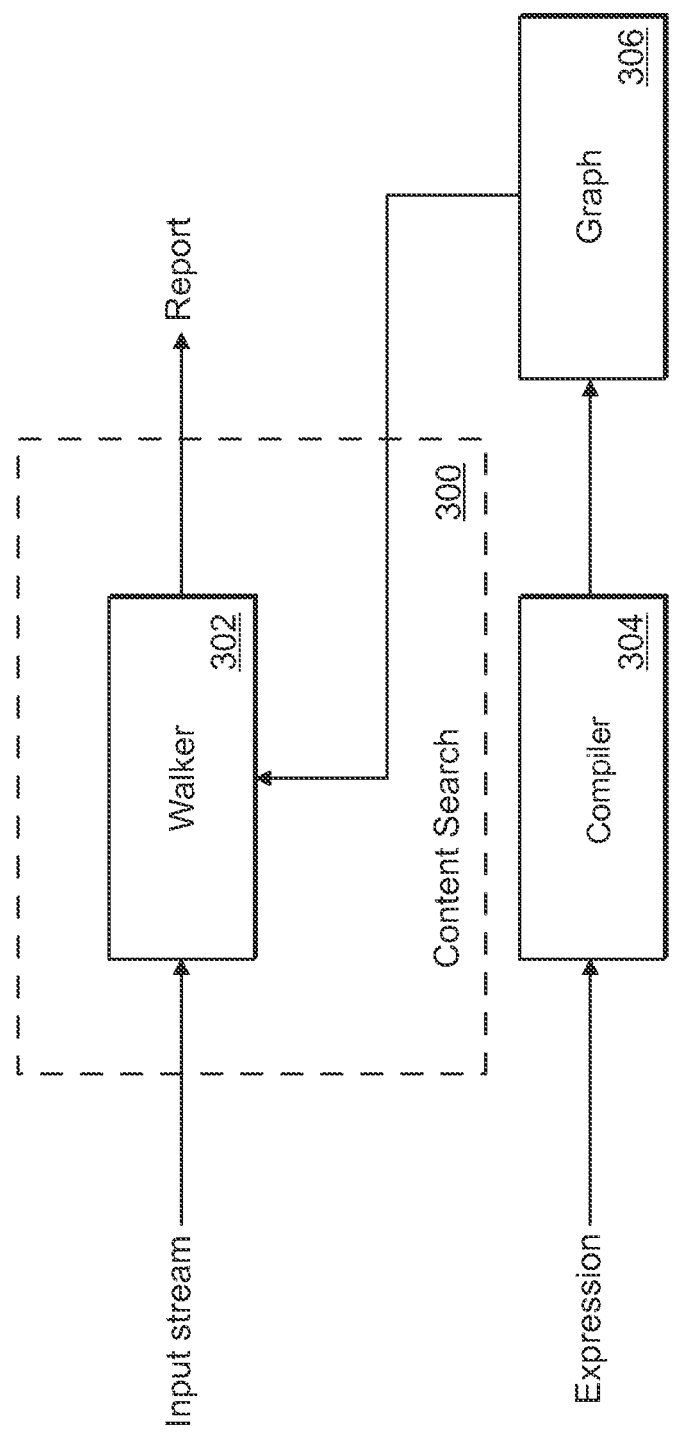
FIG. 3 is a block diagram illustrating content search elements used by the processor of FIGS. 1A and 1B.

FIG. 3 is a block diagram illustrating content search macros that may be used by a processor 202 in the network services processor 100 shown in FIG. 2. Content search macros 300 may include a walker software component (process) 302 for searching the DFA-based content search graph that may be generated via a compiler software component 304. The content search macros 300 may be stored in L2/DRAM (212, 108) and may be executed by a processor 202. The DFA-based content search graph may be stored in low latency memory 118 which is accessible directly by the processor 202 through the low latency bus and low-latency memory controller shown in FIG. 2. The compiler 304 translates expressions into a DFA-based content search graph with a plurality of nodes.

After the compiler 304 has generated the content search graph and the graph may be stored in low latency memory 118, the walker process 302 executed by one of the processors 202 walks input data (e.g., a string of characters) in the received data packet one character at a time and outputs a set of matches based on a search for a pattern in the input data using the content search graph.

Figure 4:
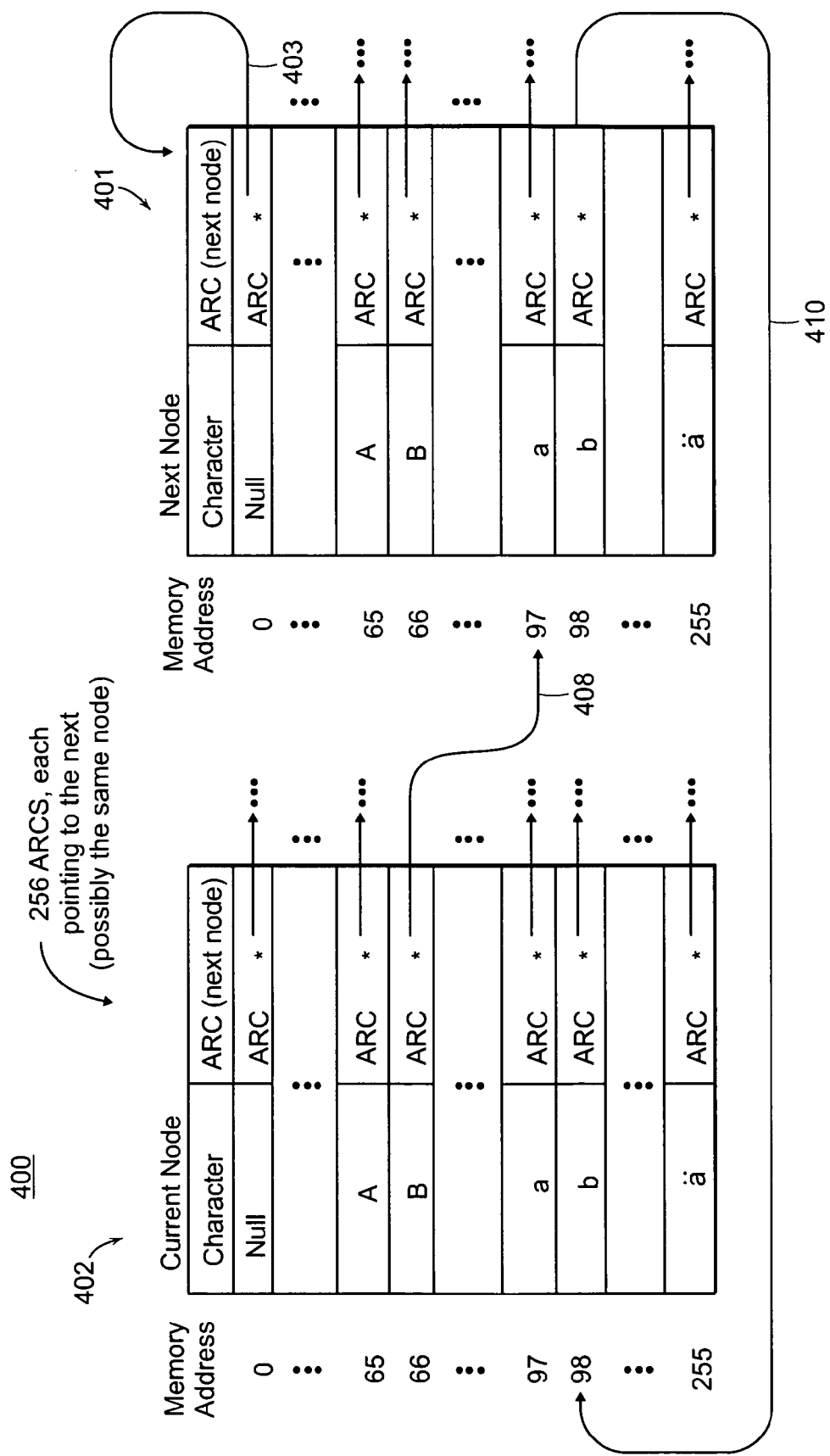
FIG. 4 is a block diagram of an example data structure that is used by the Content Search Mechanism (CSM) to traverse a graph.

FIG. 4 is a block diagram of an example of a typical data structure 400 that may be stored in Low Latency Dynamic Random Access Memory 118, or the main DRAM 108, and used by the Content Search Mechanism (CSM) executing in a processor 202 to traverse a graph. The data structure 400 may be generated by the compiler component 304 based on the expressions to be searched for in the input stream.

The data structure may include a plurality of nodes, for example nodes 402 and 401, that may be used in a content search graph according to an example embodiment. Each node in the graph may include an array of 256 next node pointers, one for each unique input byte value; that is, $2^8$ (256 possible values, or 256 addresses) representing an ASCII value of the input. Each next node pointer contains a next node ID that directly specifies the next node/state for the input byte value.

As shown in FIG. 4, a current node 402 comprises 256 arcs. Each arc represents an input ASCII value. For example, in node 402, the arc addressed as '97' includes a next node pointer for the character 'a.' Similarly, a next node 401 also comprises 256 arcs, each arc comprising a unique address and including a next node pointer for a corresponding ASCII value.

The arcs of a node may be forward arcs (e.g., arcs which point to next nodes in the DFA graph), backward arcs (e.g., arcs which point back to a root node or a prior node), or repeating arcs (e.g., arcs which point back to the node to which they are associated with). Arc 403 of node 401 comprises a node pointer to node 401, and is therefore an example of a repeating arc. Arc 410 of node 401 comprises a next node pointer to node 402, which in this context is considered to be a prior node, and therefore arc 410 is an example of a backward arc. In the example provided by FIG. 4, the arc addressed at '66' of current node 402 comprises a forward next node pointer 408 pointing to next node 401, representing a character match of 'B' with the input stream. It should be appreciated that although FIG. 4 only shows 2 nodes, any number of nodes may be included in a DFA based content search graph.

Figure 5A:
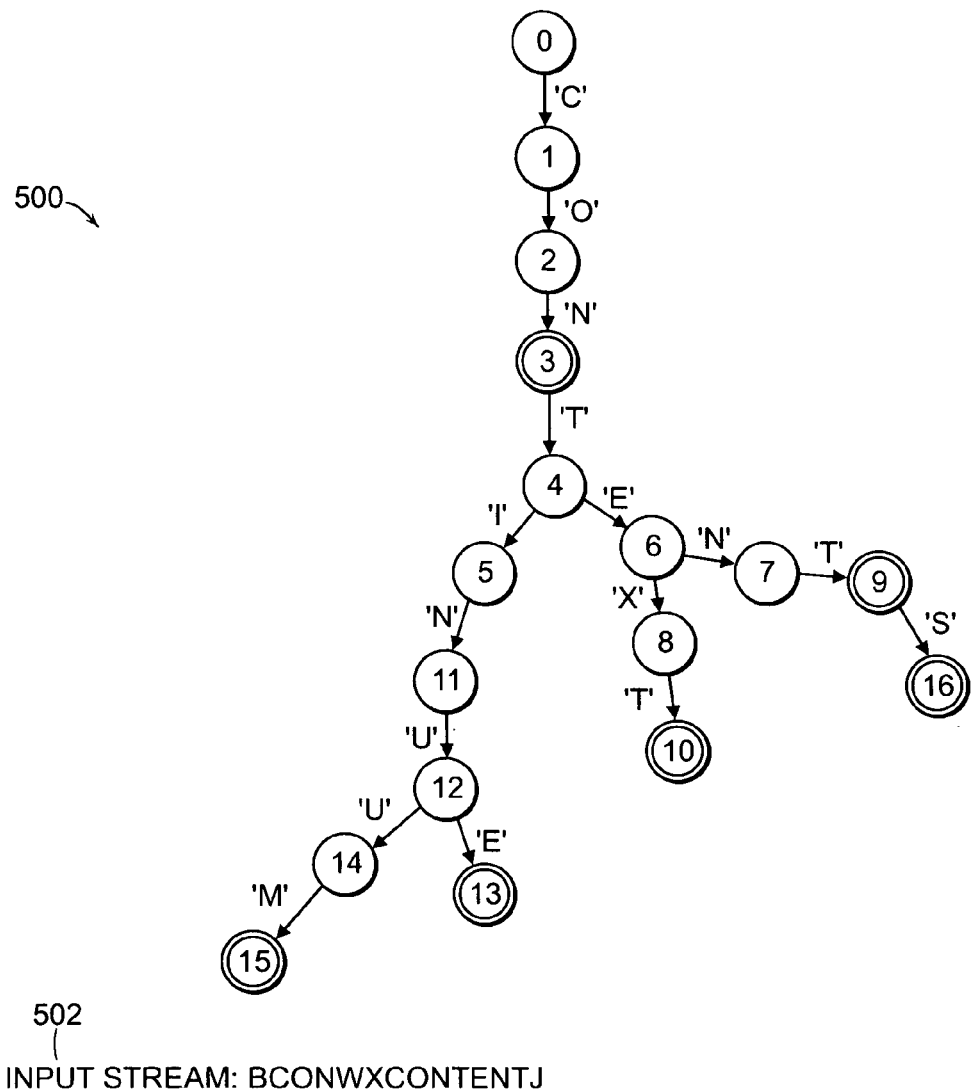
FIG. 5A illustrates an example of a DFA graph.
Figures 2, 5B:
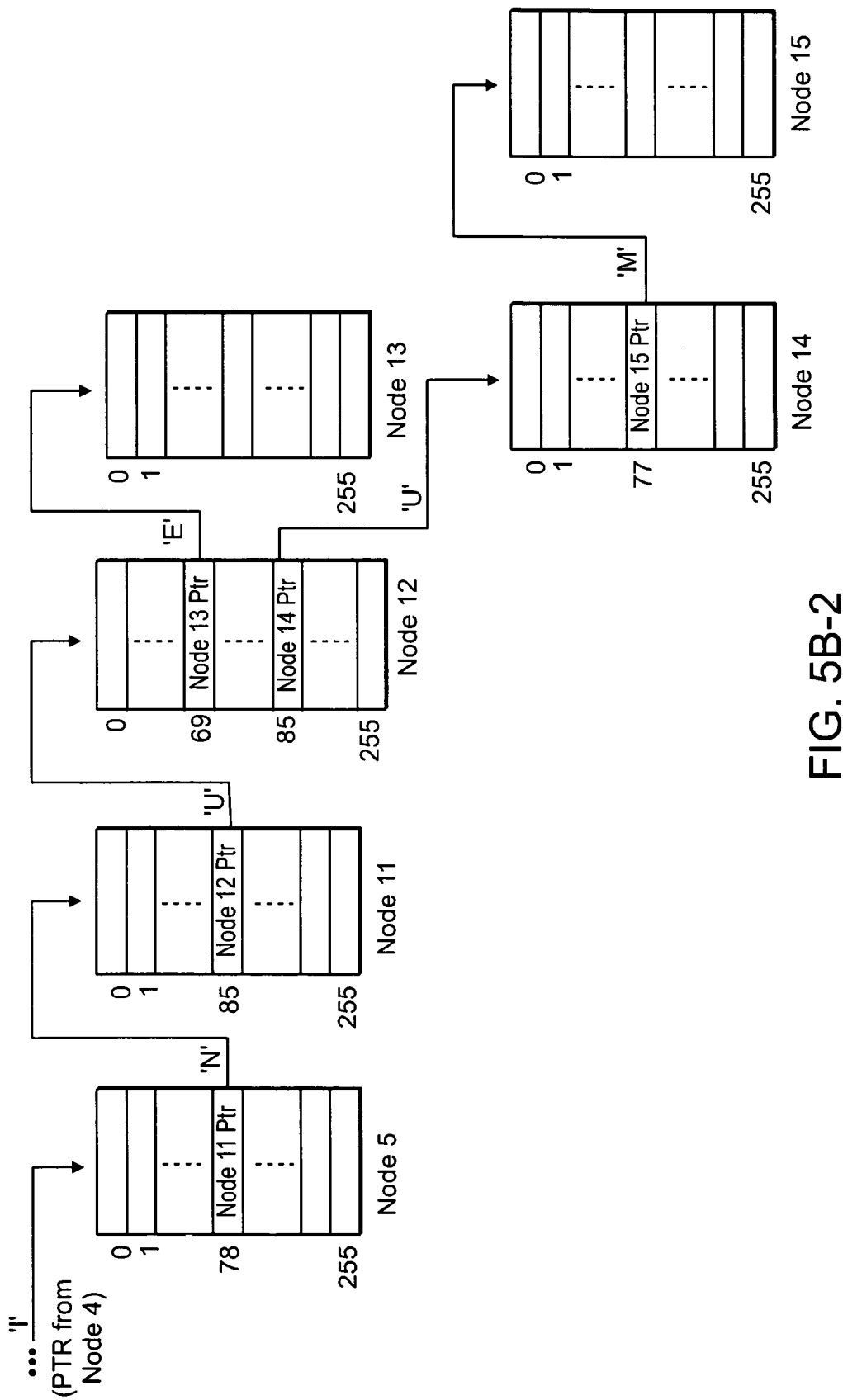
FIGS. 5B(1)-5B(3) are block diagrams of example data structures of the nodes of FIG. 5A.
Figures 3, 5B:
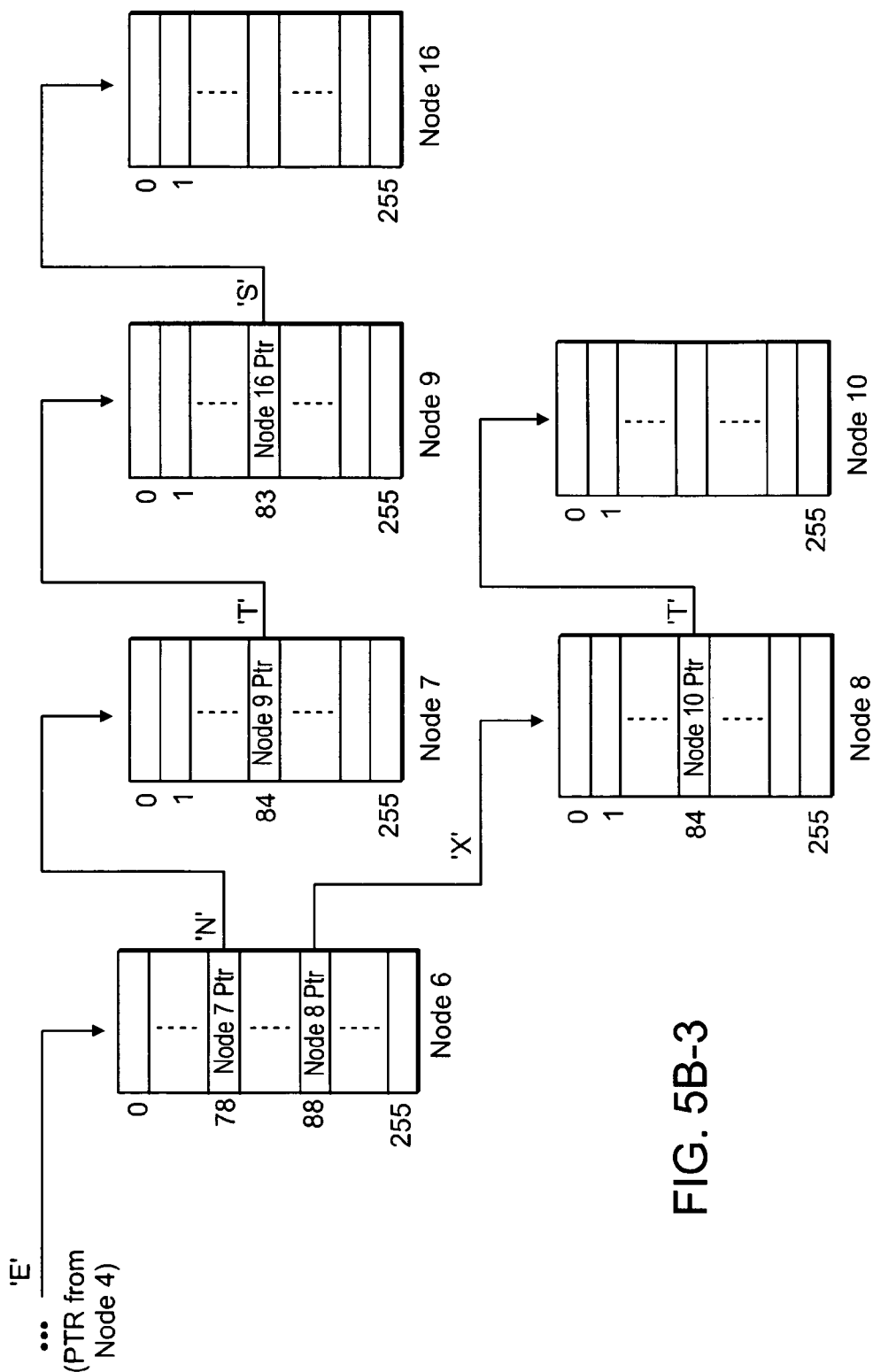

FIG. 5A provides an example of a DFA graph 500 complied via the compiler 304. For simplicity, only forward arcs have been illustrated in the example graph 500. A table 504 illustrates all of the possible expression matches, and the corresponding nodal paths, for the example DFA graph 500. FIGS. 5B(1)-5B(3) illustrate an example of the memory representation of the nodes in the uncompressed DFA graph 500, of FIG. 5A. Table 551 illustrates the relationship between the node characters and their corresponding ASCII values. FIG. 5C illustrates an example of pseudo code that may be employed by the walker process in traversing the uncompressed DFA graph 500.

In FIGS. 5B(1)-5B(3), the node marked as '0' is the root node and is a starting position for traversing the graph with the walker process 302. Each of the nodes are interconnected through arcs represented by the lines connecting each node. Each of the nodes '0'-'16' includes 256 arcs, stored in memory, indexed from 0 to 255, as shown to the left of each node. For the sake of clarity, the arcs in all the nodes which point to Node 0 (i.e. root node) are shown empty in FIGS. 5B(1)-5B(3). For example, out of 256 arcs in Node 1, arc at index 79 point to next node 2 (as shown in FIG. 5B(1)) and rest of 255 arcs contain next node pointer pointing to Node 0. As shown in the pseudo code of FIG. 5C, the node structure may be defined 505 as a vector including 256 sections, each section corresponding to a unique arc in the node. An arc structure 507 may also be defined. In the present example provided by FIG. 5C, the arc structure is defined to be 32 bits in size including flags, arc pointers, and reserved space. In FIGS. 5B(1)-5B(3) the index values are displayed on the left-hand side of each node for illustrative purposes, these index values are not stored in memory. Each arc comprised in the nodes may be accessed using the ASCII value, corresponding to the index values shown in FIGS. 5B(1)-5B(3), of a character under review, where each access requires an access into memory.

The arcs shown in FIG. 5A are forward arcs representing a character match between the expression being searched and an input character. Of the nodes shown in FIGS. 5B(1)-5B(3), nodes '0,' '1,' '2,' '3,' '5,' '7,' '8,' '9,' '11,' and '14' each include only one forward valid arc (e.g., an arc that provides a forward next node pointer to a node other than the root node). Nodes '4,' '6,' and '12' each include two forward valid arcs.

The nodes comprising a double line, as shown in FIG. 5A, (e.g., nodes 3, 9, 10, 13, 15, and 16) are referred to as mark nodes and represent a string match in the input stream. For example, the double line around node 3 represents a string match of 'CON'; node 9 represents a string match of 'CONTENT'; node 10 represents a string match of 'CONTEXT'; node 13 represents a string match of 'CONTINUE'; node 15 represents a string match of 'CONTINUUM'; and node 16 representing a string match of 'CONTENTS.' Nodes '10,' '13,' '15,' and '16' are leaf nodes. A leaf node is a node that is located at the end of a DFA branch and has each of its arcs pointing back to the root node. A leaf node is also typically a mark node representing the end of an expression match. The walker process may identify a leaf or mark node by a flag setting included in the node data structure. As an example, the flag in an arc may indicate that a next node is marked node. Therefore, the arc pointing to Node 3 (from Node 2 for character 'N') may have a flag setting indicating that the next node (which is Node 3) is marked node representing an expression match. If the flag setting indicates that a mark or leaf node has been traversed, the walker process may report that a match in the expression has been found.

Referring to FIGS. 5B(1)-5B(3), in operation, the walker process 302 may evaluate the input stream one byte at a time. As an example, consider the input stream 502. Initially, the walker process 302 may assign the root node pointer to a current node pointer variable 'node_ptr,' which will be evaluated (FIG. 5C, line 1). The walker 302 evaluates the first character of the input stream 502 which is 'B,' according to the pseudo code, the ASCII value of the first character may be assigned to the character variable 'ch' (FIG. 5C, line 2). The walker then proceeds to the root node to access the next node pointer associated with the character 'B.' The walker process may use the variable 'ch' to index in to the current node, which in the present example is the root node '0' (FIG. 5C, line 4). In the example provided by the DFA graph 500, as shown in FIG. 5B(1), the root node only includes a forward match for the character 'C.' In the case that a forward valid arc pointing to a mark node is detected, a flag may be set 507 indicating that an expression match has been found. In example embodiments, the walker process may monitor flag settings to determine if a mark node has been traversed and if an expression match has been found (FIG. 5C, line 5).

In the current example, the arc associated with the character 'B' is a repeating arc (not shown). The presence of the repeating arc will not cause the flag 507 to be set and therefore, the walker process 302 may assigned the next node pointer variable 'node_ptr' to the arc associated with the character 'B' resulting in the walker process 302 to continue evaluating the root node '0' (FIG. 5C, line 6).

The walker process 302 then proceeds to the next character in the input stream 502 which is 'C,' and reassigns the character variable 'ch' to the ASCII value of the current character 'C' (FIG. 5C, lines 7 and 2). Upon locating the arc associated with the ASCII value of the character 'C,' the walker 302 finds a next node pointer providing a forward match and pointing to node '1' (FIG. 5C, line 4). Since, node '1' is not a mark node, the flag status will remain unchanged (FIG. 5C, line 5). Thereafter, the walker process 302 intakes the next input stream character 'O,' and proceeds to find the associated arc and next node pointer providing a forward match and leading to node '3' (FIG. 5C, lines 6 , and 2-4). Since node '3' is a mark node, a flag 507 may be set causing the walker process 302 to register that an expression match for the string 'CON' in the input stream has been found (FIG. 5C, line 5).

Depending on the specific application, the walker process 302 may proceed to evaluate the next character in the input stream 502, which is the character 'W' (FIG. 5C, lines 6, 7, and 2-5). The arc in node '3' associated with the character 'W' comprises a backward next node pointer to the root node '0,' the only forward match associated with node '3' is for the character 'T.' Thus, the walker process 302 follows the next node pointer associated with the character 'W' and proceeds to the root node '0' (FIG. 5C, lines 6 and 7). Thereafter, the walker process 302 proceeds to evaluate the next character in the input stream 502, which is 'X' and reassigns the character variable 'ch' equal to the ASCII value associated with the character 'X' (FIG. 5C, line 2).

Upon evaluating the next input character 'X,' it is determined that the arc associated with the character 'X' in the root node '0' includes a repeating next node pointer pointing to the root node '0' (FIG. 5C, line 4). Thus, the walker process 302 will proceed to evaluate the next character in the input stream. Following the same logic discussed above, the walker process 302 may proceed to find an expression match for the string 'CONTENT' in mark node '9.' Upon reading the next character 'J,' the walker process traverses back to the root node '0' and the arc and next node pointer associated with the character T are read from the root node '0.' Upon detecting a repeating arc and reaching the end of the input stream 502, the walker process 302 completes its walking of the DFA graph 500 (FIG. 5C, lines 3 and 8).

Figure 6:
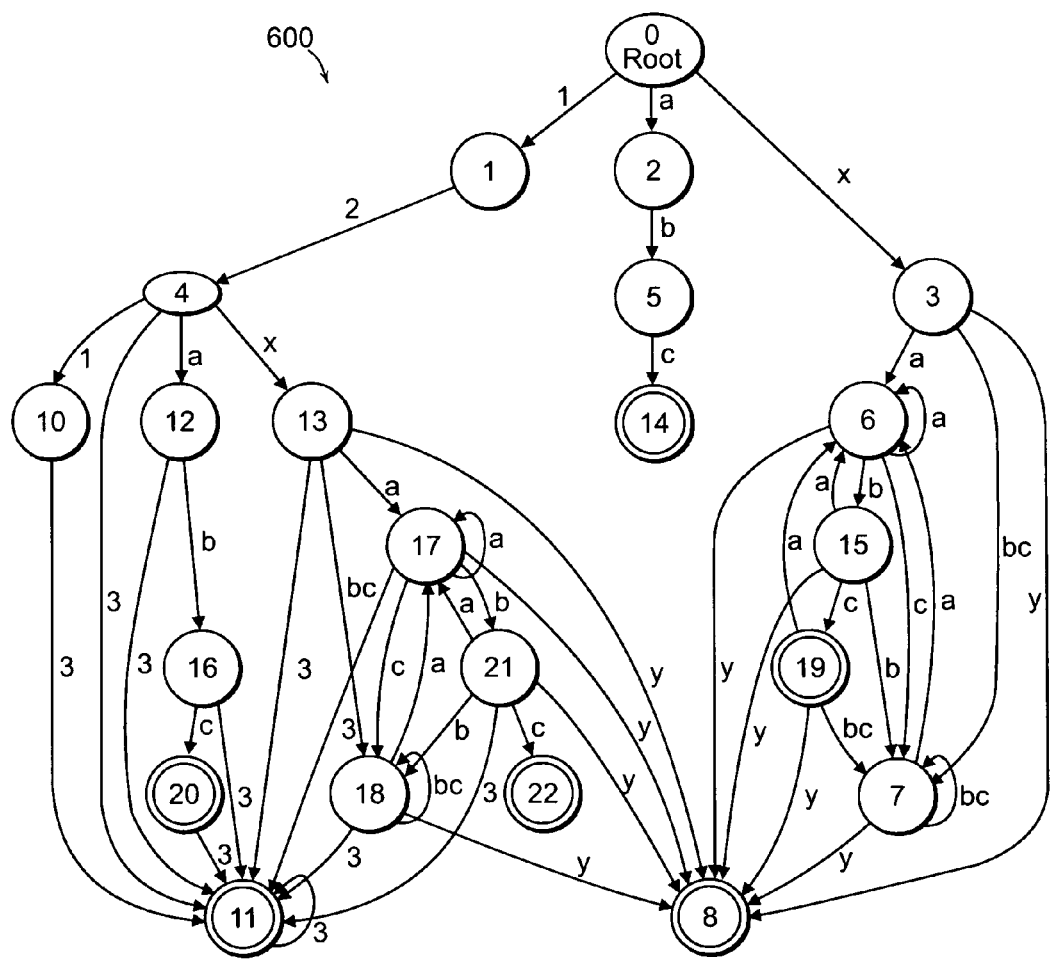
FIG. 6 illustrates an example of another DFA graph.

The examples provided by FIGS. 5A and 5B(1)-5B(3) illustrate a simplified DFA graph. FIG. 6 provides an illustration of a more realistic view of only a sub-portion of a DFA graph. Again, the backward arcs to the root node of each node have not been shown for simplicity. The DFA graph 600 comprises a number of branches which are interconnected. A DFA graph such as the one shown in FIG. 6 requires a substantial amount of memory to store, as well as a significant amount of time and system resources to traverse the graph.

Typically, a design trade-off must be made in the implementation of DFA graph search systems. The trade-off is between creating a compressed DFA graph which may comprise a lower memory requirement for storage, but may require two to three memory accesses for each input character. Alternatively, a larger DFA graph may be utilized that may require only a single memory access per input character, but at the cost of a large memory requirement for storage.

Figure 7:
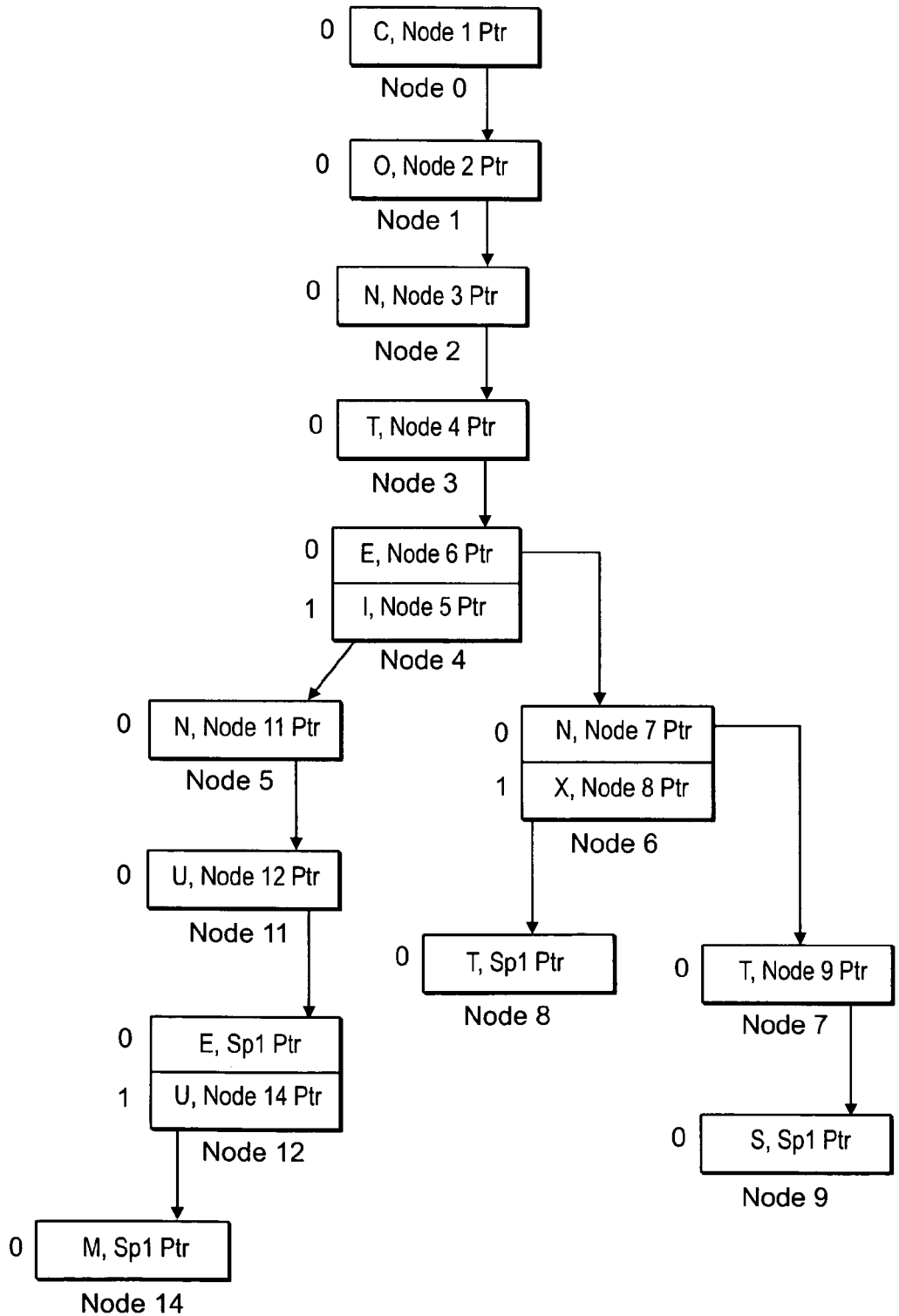
FIG. 7 is a block diagram of an example data structure of the nodes of FIG. 5A upon compression.

In an example embodiment, a compressed DFA graph is presented. The compressed DFA graph that has the advantages of low memory utilization and single memory access per the reading of each input character. In an example embodiment, all arcs which point back to the root node, or a designated node, are deleted from all other nodes and are not stored in memory as part of graph. FIG. 7 provides an illustrative example of the nodes of a compressed version of the DFA graph using this embodiment for uncompressed graphs shown in FIGS. 5A and 5B(1)-5B(3). In contrast to the nodes of FIGS. 5B(1)-5B(3), the nodes of FIG. 7 include only valid arcs (e.g., arcs which represent a character match in an expression). Furthermore, the valid arcs included in the compressed nodes comprises a copy of the character the arc is associated with as well as a next node pointer, as is shown in FIG. 7.

In a compressed node, all arcs which are not associated with an expression match are pruned or deleted. Nodes '0,' '1,' '2,' '3,' '5,' '7,' '8,' '9,' '11,' and '14' of FIG. 5B each included 256 arcs with only one valid arc. The same nodes, as compressed in FIG. 7, include only one arc, which is indexed as '0' as shown to the left of each node. Similarly, the uncompressed nodes '4,' '6,' and '12' of FIG. 5B included 256 arcs with only two arc being valid. The compressed versions of nodes '4,' '6 ,' and '12' of FIG. 7 include only two arcs, which are valid arcs indexed as '0' and '1.' The leaf nodes '10,' '13,' '15,' and '16' have been pruned or deleted in the compressed DFA graph. Arcs in compressed nodes which originally pointed to leaf nodes in the uncompressed DFA graph (e.g., nodes '8,''9,' and '14') may include a form of identification (e.g., a special pointer 'Spl ptr') that may be used by the walker process as an indication the searching for a particular expression has ended.

In another example embodiment, a set of designated nodes (including at least 1 node) may be identified. All the arcs of all nodes, which point to same next node for corresponding character as (one of) the designated node does, are pruned and not stored in Nodes. Taking the DFA graph of FIG. 6 as an example, if node '13' was assigned as a designated node, all of the arcs pointing to node '8' for the character 'y' are pruned (e.g., the arcs associated with the character 'y' from nodes '3,' '6,' '7,' '15,' '18,' '19,' '17,' and '21'; with the exception of the designated node '13'), all the arcs pointing to node '11' for the character '3' are deleted (e.g., the arcs associated with the character '3' from nodes '4,' '10,' '12,' '16,' '17,' '18,' '20,' and '21'; with the exception of the designated node '13'), all arcs pointing to node '17' for the character 'a' are deleted (e.g., the arcs associated with the character 'a' from nodes '18,' and '21'; with the exception of the designated node '13'), and all the arcs pointing to node '18' for the character 'b' (e.g., the arc associated with the character 'b' from node '21'; with the exception of the designated node '13') are deleted as well. The deleted arcs in each node leave holes in the node data structure. These holes may then be compressed in order to save memory and required storage space.

As mentioned before, there may be multiple designated nodes which may allow further arc pruning There may be different designated nodes for different sub-sections of the DFA graph. Pruned nodes may contain information about the designated node used for pruning. This information may also be stored in arc pointing to pruned node.

Graph compression using example embodiments may greatly reduce memory requirements and processing speeds associated with the DFA graph. For example, in Intrusion Detections Systems (IDS) applications, it is possible to achieve a reduction in size of the DFA graph of at least 20× or greater. In Anti-Virus systems (AV), even greater DFA graph reduction may be obtained. The amount of graph reduction is highly application and signatures (i.e. patterns used to compile graph) dependent, but the insights used for the example embodiments presented herein are fundamental to any DFA graph.

Due to the compression of memory to account for the holes, it is no longer possible to read the address of an arc via indexing an associated character's ASCII value. Therefore, in an example embodiment, a method for traversing a graph featuring compressed nodes and arcs is presented.

The walker process may be configured such that if a valid arc has not been found, the walker may default and traverse to a designated node. The address of the designated node may be included in metadata which may be stored in memory. It should be appreciated that the designated node need not be the root node and may instead be any node in the DFA graph.

Figure 8:
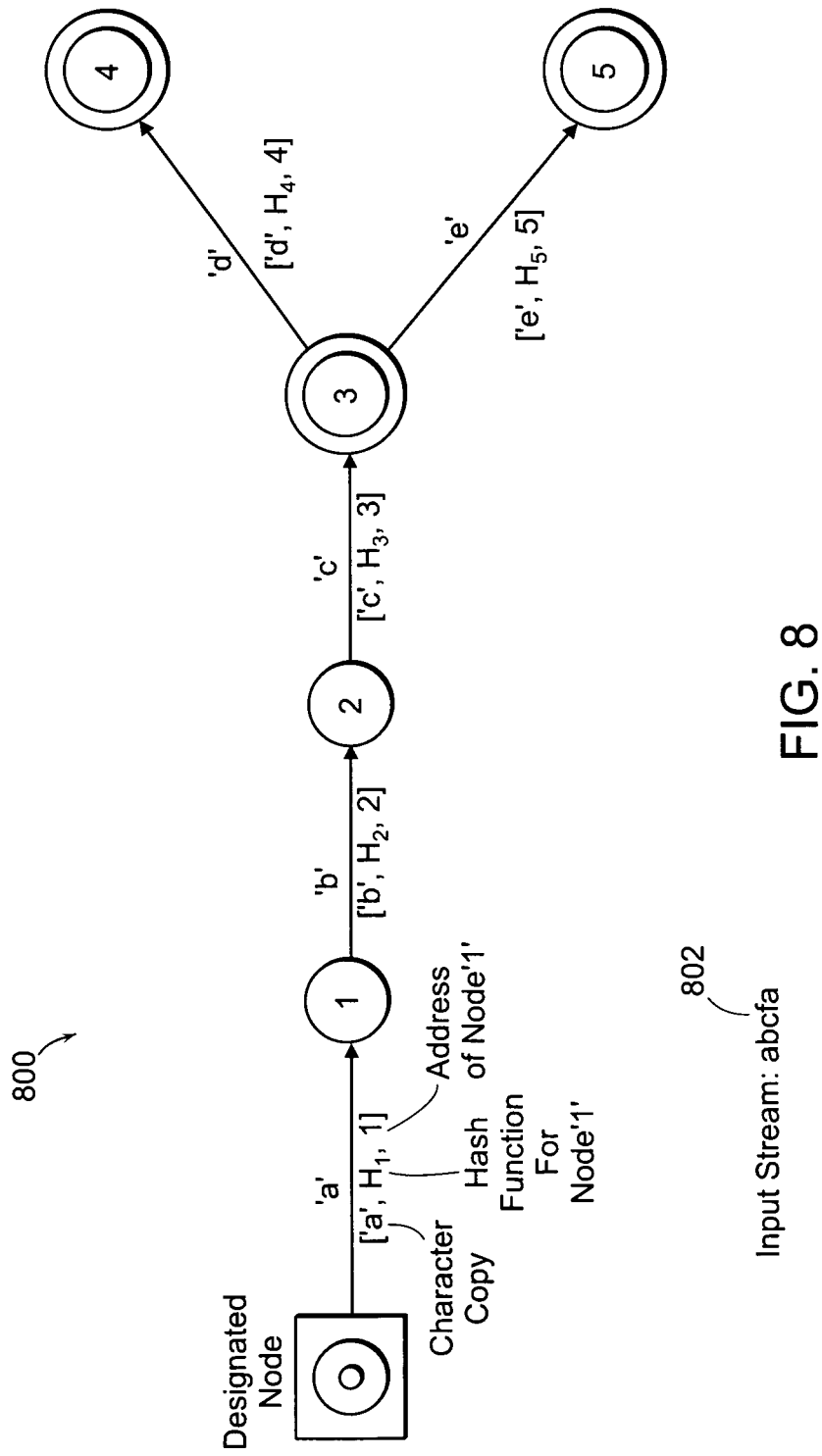
FIG. 8 is an illustrative example of DFA graph traversing.

FIG. 8 provides an illustrative example of how a walker process 302 may traverse a compressed graph (e.g., a graph with redundant arcs removed). FIG. 9 provides an example of pseudo code that may be used to manage the walker process 302 in a compressed DFA graph. In the example provided by FIG. 8, the root node '0' has been assigned by the compiler as the designated node. It should be appreciated that any node in the compressed DFA graph may be assigned as the designated node, and it should be further appreciated, as mentioned above, that the DFA graph may include any number of designated nodes.

In the DFA graph 800, each valid arc of a prior node '#−1' includes the following three items: (1) a copy of a character associated with an expression character match to a current node '#'; (2) a hash function '$H_\#$' associated with a current node '#' which generates a hash value used to index into the current node '#' in order to find a next arc associated with a next node '#+1' and a next character; and (3) a node pointer pointing to the current node '#.' In contrast, the arcs in the DFA graphs of FIGS. 5A, 5C(1)-5C(3), and 6 only include item (3). The arc structure may also be defined to include a flag setting or status, as well as reserved memory as shown in 905. Depending on the implementation, an arc size may typically be 64 or 32 bits. It should be appreciated that any other arc size may be employed.

In operation, the walker process 302 may initially assign the next node pointer variable 'node_ptr' to point to the root node '0' and may also assign the hash function variable 'hash_fn' to the hash function associated with the root node '0' (FIG. 9, lines 1 and 2). Consider the input stream 802, the walker process 302 analyzes the first byte of the input stream 802 which is the character 'a' and assigns the ASCII value associated with the character 'a' to the character variable 'ch' (FIG. 9, line 3). In the case that the root node is compressed, the walker process 302 may utilize the hash function, using the variable 'ch,' associated with the root node in order to find the valid arc associated with the character 'a.' The hash function may produce a hash value ($i_{0a}$) that may be used to index in the root node '0' in order to find the arc associated with the character 'a' (FIG. 9, line 5).

A hash function is deterministic, therefore if two hash values generated from the same hash function are different, the two input values to the hash function must also be different. Based on this logic, a hash function never provides a false negative (e.g., the hash value of a character associated with a valid arc in a current node always correctly indexes to the arc), but however the hash function may provide a false positive (e.g., in the occurrence that input character is not associated with any valid arc, the hash function still provides an index to one of the arcs in the current node). Therefore, the walker process 302 may be configured to test hash values to ensure a false positive has not occurred. Another property of hash function is that there is no collision (i.e. no two input values generate same hash value).

Once the associated arc is obtained, the character copy included in the arc may be extracted and assigned to the variable 'arc_ch' (FIG. 9, line 6). The walker process 302 compares the ASCII values of the character copy 'arc_ch' with the current input character 'ch.' If the two ASCII values are not equal, the walker process 302 recognizes the current arc as a false positive. If there is no valid arc for this particular character (i.e., the arc associated with the character has been pruned), the walker process may traverse to the designated node and walk to the node where the designated node points to for this particular character.

In the current example, since the root, or designated, node '0' does include a valid arc for the character 'a,' the walker process will recognize the arc as being valid. Thereafter, the walker process 302 may evaluate flag settings in order to determine if the current node is a mark node (FIG. 9, line 9). The walker process 302 may proceed to assign the node pointer variable 'node_ptr' to the valid arc associated with the character 'a' and may also assign the hash function variable 'hash_fn' to the hash function associated with the next node to which the valid arc points (FIG. 9, lines 10-12). It should be appreciated that the root node may not be compressed, therefore the walker process 302 may index into node '0' in the usual manner explained in relation to FIGS. 5A, 5B(1)-5B(3), and 5C. It should also be appreciated that the hash function associated with the root node may be stored as part of the graph metadata.

The walker process 302 proceeds to evaluate the next input stream 802 character, which is 'b,' and assigns the input variable 'ch' to the corresponding ASCII value (FIG. 9, line 3). Using the hash function included in the valid arc associated with the character 'a,' a hash value ($i_{1b}$) is generated and used to index into the current node '1' (FIG. 9, line 5).

Since the character 'b' is associated with a valid arc in the current node '1,' the hash value $i_{1b}$ will index into node '1' and obtain the valid arc associated with the character 'b' as shown in FIG. 8 (FIG. 9, line 5). Upon obtaining the valid arc, the walker process 302 then utilizes a compare function to verify that the ASCII value of the character 'b' associated with the valid arc is the same as the ASCII value of the input stream character being evaluated 'b' to account for false positives (FIG. 9, lines 6 and 7). The comparison function then returns a positive match since the arc character and input character are equal.

Upon obtaining the positive match and checking the flag status, the walker process 302 proceeds to reassign the next node pointer and hash function variables and evaluates the next input stream byte, which is the character 'c'(FIG. 9, lines 8-11 and 3). The hash function associated with the 'b' arc, $H_2$, then generates a hash value using the character 'c.' The generated hash value ($i_{2c}$) is used to index into node '2' in order to find the valid arc associated with the character 'c' (FIG. 9, line 5). Upon obtaining the valid arc associated with the character 'c,' the walker process 302 again utilizes the comparison function to determine if the current input stream character 'c' is the same as the character associated with the valid arc which was just indexed. Since the two characters are indeed the same, the walker process 302 will receive a positive match notification from the comparison function, and therefore proceeds to generate a hash value with the next input character, 'f'(FIG. 9, lines 6-12 and 3-5).

Upon obtaining a hash value ($i_{3f}$) from the valid arc associated with the character 'c,' the walker process 302 indexes into node '3.' In the example provided by FIG. 8, node '3' comprises two valid arcs, one associated with the character 'd' and the other associated with the character 'e.' In this situation, the hash function ($H_3$) provides an index to either one of the valid arcs of node '3.' Upon using the comparison function, a negative match result is reported. The walker process 302 then proceeds to the designated node (root node '0') and searches for a valid arc associated with the character 'f' (FIGS. 9, 6-8 and 1-2). Alternatively, if the designated node (in this case the root node) is not compressed, an associated hash function may be used to find the valid arc associated with the character 'f.' Since such an arc does not exist, the walker process will remain at the designated node, or root node '0,' and evaluate the next input character 'a' (FIG. 9, line 3). It should be appreciated that a single hash function may be utilized for the entire DFA graph, instead of a hash function being associated with each node. The single, or general, hash function may be stored in the graph metadata. It should also be appreciated that the comparison function may be a string character comparison function configured to compare character values rather than ASCII values. It should also be appreciated that any form of comparison may be employed.

The hash walker process described above only makes an access to memory while indexing into a node in order to obtain a valid arc. Therefore, at most, only one memory access is needed for each character in the input stream. Conventional walking processes typically require two or three memory accesses. Thus, the compressed arc and node graph, and the hash walking process may be utilized to reduce the number of memory accesses as well as reduce the amount of memory needed to store the DFA graph.

It should be appreciated that other methods of managing the walker process 302 may be utilized to traverse the compressed node and arc DFA graph. For example, the walker process 302 may be configured to read each arc in a node one by one until a valid arc for the character in question has been found.

Alternatively, in a single memory access, the walker process 302 may be configured to retrieve a number of arcs (e.g., the walker process may retrieve five arcs in a single memory access) and utilize the comparison function on all of the retrieved arcs. If a positive string match is not obtained, the walker process may make another memory access to retrieve a second grouping of arcs, and so on until a positive match has been found or until all of the arcs in the node have been evaluated.

In another embodiment, each valid arc or node may comprise a directory, or location table, generated by the compiler such that upon retrieving the location table from memory, the walker process 302 need only find the entry of the character in question in order to find the address of the associated arc. If the associated arc does not exist, the walker process may default to a root or designated node.

Figures 10, 11:
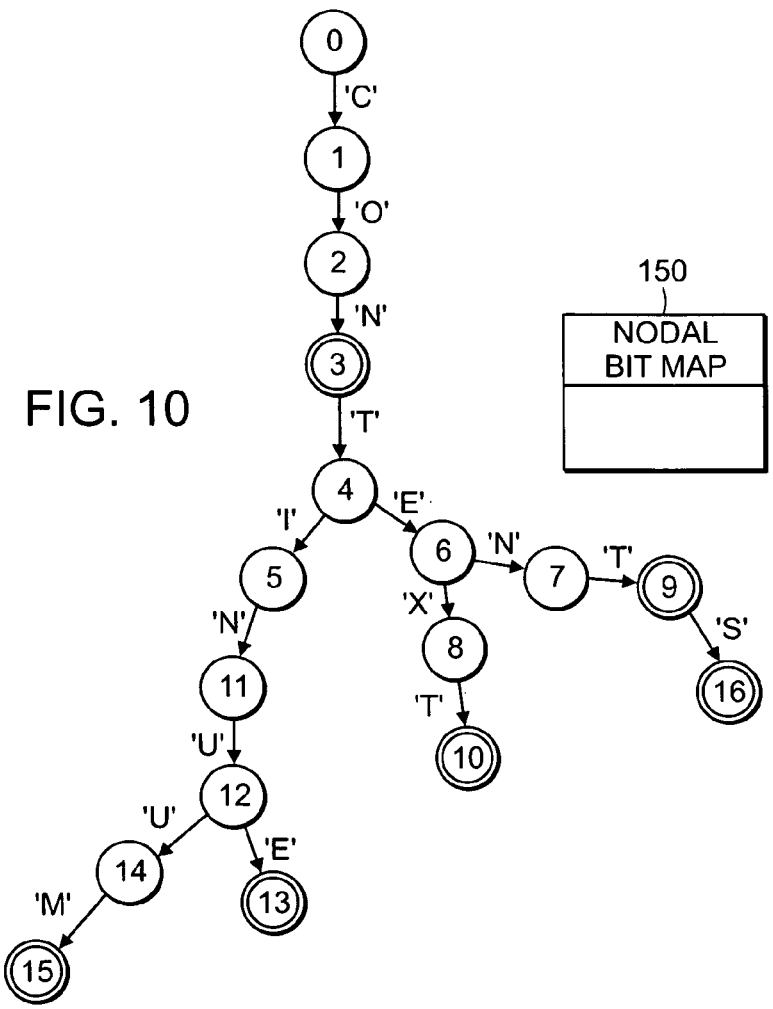
FIG. 10 is an illustrative example of a DFA graph including a nodal bit map.
FIG. 11 is an illustrative example of the nodal bit map of FIG. 10 featuring a one-to-one mapping scheme.

FIG. 10 illustrates the DFA graph of FIG. 5A, which further includes nodal bit maps. As illustrated, the valid arc associated with the character 'E' pointing from the node indexed as '4' to the node indexed as '6,' includes a nodal bit map 150. Any number of, or all, valid arcs in the DFA graph may include a nodal bit map. The nodal bit map may provide information on the arc configuration of the node being pointed to by the valid arc associated with the nodal bit map. In the example provided by FIG. 10, the nodal bit map provides information on the arc configuration of node '6,' which is the node being pointed to by the valid arc associated with the nodal bit map 150. The nodal bit map 150 provides an indication on whether or not a particular valid arc exists in node '6.' It should be appreciated that multiple nodes may point to a same node, therefore all arcs pointing to a same node will include the same nodal bit map.

FIG. 11 illustrates a nodal bit map 150A, which is an example embodiment of the bit map 150 illustrated in FIG. 10. It should be appreciated that the ASCII values and ASCII characters are shown for the purpose of clarification and need not be included.

The nodal bit map may include an indicator value 155 associated with each ASCII value 151. The indicator value may be a binary indication as to whether a valid arc, associated with a particular ASCII value and ASCII character, exists within the node being represented by the nodal bit map. An indicator value of '0' may indicate that a valid arc associated with an ASCII value does not exist, while an indicator value of '1' indicates that the valid arc does exist within the current node. It should be appreciated that an indicator value be provided in any alphanumerical form.

As shown in the illustrative example, the indicator value of the ASCII character 'A' is indexed by its corresponding ASCII value '65.' Since a valid arc associated with the character 'A' does not exist in node '6,' the indicator value for the character 'A' in the nodal bit map 150A is '0.' However, since the valid arcs associated with characters 'N' and 'X' do exist in node '6,' the corresponding indicator value for these characters may be set to 1. All other ASCII characters, indexed by their corresponding ASCII value, may be assigned an indicator value of '0' since the node '6' does not include valid arcs associated with these characters.

A walker process may utilize an indicator value to determine if a valid arc exists for a particular character. Once a determination has been made that a particular valid arc does exist, the walker process may proceed to hash the ASCII value of the character under evaluation and access from memory a valid arc in a next node, as described in relation to FIG. 8. If, by evaluating the nodal bit map, it is determined that a particular valid arc does not exist, the walker process may traverse back to the root node or a designated node associated with the current node. Thus, by evaluating the nodal bit map the walker process may avoid making an unnecessary access to external memory. The walker process also avoids the rescan of input characters, should the hash function provide a false positive. Minimizing the number of accesses to external memory will reduce the overall runtime of the system.

It should be appreciated that the example nodal bit map 150A provided by FIG. 11 illustrates a 1-to-1 mapping where the map includes as many entries as there are ASCII characters, with each ASCII character being indexed by its respective ASCII value. It should also be appreciated that in certain applications it may not be practical to store 256 bits (the size of a nodal bit map featuring a 1-to-1 mapping) in each valid arc of a node. Therefore, in an attempt to reduce the storage size of a nodal bit map, one example embodiment may include any number of mapping combinations N-to-1, where N is a grouping factor and may be any nonzero integer between 1 and 255.

Employing N-to-1 mapping schemes may be advantageous as it may reduce the amount of memory needed to store each nodal bit map. For example, the nodal bit map 150A of FIG. 11 requires 256 entries. If a 2-to-1 mapping scheme were employed, the number of required entries may be reduced to 128. Similarly, if a 4-to-1 mapping scheme were employed, the number of required entries may be further reduced to 64.

FIG. 12 illustrates a nodal bit map 150B, which is an example embodiment of bit map 150 illustrated in FIG. 10. The nodal bit map 150B includes a uniform 4-to-1 mapping, therefore the bit map includes 64 entries (indexed from '0' to '63') for the 256 ASCII characters. In the example provided by FIG. 12, each grouping of four ASCII characters are assigned to a single entry in the nodal bit map 150B.

For example, the first four indexed ASCII characters 'NUL' (Null), 'SOH' (start of heading), 'STX' (start of text), and 'ETX' (end of text), including ASCII values of '0'-'3' respectively, may all be placed under the index '0.' Likewise, successive groups of four ASCII characters may be indexed in ascending order depending on their respective ASCII value.

In the example provided by FIG. 10 and FIG. 12, the nodal bit map is stored within a valid arc of a prior node '4.' The nodal bit map provides information on the structural configuration of a current node '6,' which includes only two valid arcs associated with the ASCII characters 'N' and 'X.' In the nodal bit map 150B the groups indexed as '19' and '22,' include the ASCII characters 'N' and 'X,' respectively. Thus, both of the indexed groups '19' and '22' also include an associated indicator value having a value of '1.' An indicator value of '0' may be assigned to a particular group if none of the ASCII characters associated with the group are included in the current node. Therefore, the groups indexed as '0'-'18,' '20,' '21,' and '23'-'31' will be assigned an indicator value of 0. Note that in each grouping of four ASCII characters, only one valid arc needs to exist in order for the associated indicator value to be assigned a value of '1,' hence this grouping may also result in false positives as will later be explained in more detail.

As a walker process traverses a DFA graph employing a uniform 4-to-1 mapping scheme, the walker process may determine the appropriate nodal bit index via the ASCII value of a next input character. For example, suppose a walker process is evaluating the valid arc for the character 'E' in the prior node '4' of the DFA graph illustrated in FIG. 10. The walker process may thereafter retrieve a next character in an input stream, which for example may be the ASCII character 'X.' The walker process may determine that the ASCII value associated with the next character, 'X,' is 88. If a uniform N-to-1 mapping scheme is used, the walker process may divide the ASCII value by the uniform grouping factor, which in the example provided by FIG. 12, is 4. The result of the division may be rounded down to the nearest integer, where the result is the group index value associated with the character whose ASCII value was divided. Therefore, using the current example, the ASCII value 88 may be divided by 4 providing a value of 22, which is also the index group including the indicator value associated with the character 'X.' Similarly, if the next ASCII character in the input stream would have been 'Y,' the walker value may divide the associated ASCII value (89) by the grouping factor (4) providing a result of 22.25. Rounding down the obtained result to the nearest integer value provides an index value of 22, which in the grouped index including the character 'Y.'

Even though it is functionally correct, the side effect of this scheme is that, there are chances when an indicator value associated with a particular entry in a nodal bit map is '1,' only a single valid arc exists (e.g., only single arc associated with a single character is included in the range of ASCII values that the indication value bit represents, is present). Thus, a false positive may occur when an indication value is provided as being '1' when in fact a valid arc for an associated character does not exist in a next node.

However, the occurrence of a false positive is not detrimental to the DFA system. The only side effect of the false positive is that the walker process will access the current node in external memory to check for 'Y' even though the current node may not have an actual valid arc associated with the ASCII character 'Y.' Therefore, upon character comparison performed by the walker process while processing the arc (FIG. 9 line 7), the walker process will transition back to the root node, or designated node associated with the current node. Thus, functionality is not lost with the presence of false positives.

However, it should be appreciated that the presence of false positives defeats the purpose of avoiding external memory accesses. Thus, there is a tradeoff, between space and efficiency of algorithm while using nodal bit maps. With 1-to-1 mapping, the algorithm is most efficient but will require 256 bits for each arc, while with N-to-1 mapping, the amount of space required is small but on the cost of more external memory accesses.

In an example embodiment, a method is proposed which eliminates the need of a tradeoff. Specifically, the example embodiment may achieve almost same efficiency as a 1-to-1 mapping scheme, and requires an amount of memory comparable to that of a N-to-1 mapping scheme. This may be achieved by efficiently representing the structural configuration of the arcs, which are or can be present in any node in the entire DFA graph rather than using a complete range of ASCII characters (i.e., 0-255 ASCII values), into a smaller sized nodal bit map. The efficiently representation may depend on an actual character set of the patterns, or expressions, which are to be searched. For example, if the expressions patterns to be searched, for content inspection, only include lower case alphabet characters (i.e., characters within the ASCII value range of '97'-'122'), it would not be efficient to reserve separate bits in nodal bitmap for the remaining characters or ASCII values. One bit is enough to represent whether any arc representing a character associated within the remaining ASCII values exists, thereby providing an indicator value of '0.' It should be appreciated that the remaining ASCII values may be eliminated from the nodal bit map all together in an effort to reduce the amount of memory required to store the map on an arc. Thus, providing a non-uniform N-to-1 mapping scheme for the nodal bit map, where N may be any non-zero integer. Furthermore, the value of N throughout the nodal bit map need not be constant.

According to example embodiments, a global look-up table may be utilized when employing a non-uniform N-to-1 mapping scheme. The global look-up table may provide information as to which ASCII characters a particular indication value may provide information for.

In an example embodiment, each entry in a global look-up table may involve two fields, a valid bit and a bit location value. The valid bit may be used to indicate if a valid arc for a particular character exist in any node of the DFA graph, that is if the character is included in any searchable expressions in the DFA graph. If a particular character is included in any of the expressions to be searched, the valid bit for that particular character may be set to '1.' The corresponding bit location value may provide information on the location of the indictor value of the particular character in a nodal bit map.

If all the entries in this global table are valid and are unique (and vary between 0-255), this will be equivalent to the 1-to-1 mapping concept explained above. If all the entries in this global table are valid but multiple entries (in contiguous range) include a same bit location, this will be equivalent to the N-to-1 mapping concept explained above.

In an another example embodiment, it is possible to merge both the valid bit and bit location value into a single field. Furthermore, if a value of the bit location value surpasses a predefined range, this may provide an indication to the walker process that a valid arc for this character does not exist in the DFA graph. Alternatively, it is possible to reserve one bit in the nodal bit map (i.e., the bit indexed as '0') to represent non-existent characters and the indicator value at this location will be '0' for all nodal bit maps. This notation will be used to further explain the use of a global look-up table.

FIG. 13 illustrates an example of a global look-up table featuring the example embodiments described above. The global look-up table includes 256 entries, each entry corresponding to an ASCII character. The global look-up table and the manner in which each ASCII character has been grouped is determined with the assumption that the DFA graph associated with the global look-up table includes only valid arcs for ASCII characters in the range of '33'-'125' (i.e., 93 ASCII characters), further assume that each nodal bit map may store only 32 bits.

Note that all ASCII characters included in the range of '0'-'32' have been indexed in the nodal bit map under the index '0.' The characters which are included in an expression to be searched, valued within the range of '33'-'125,' are grouped in a uniform 3-to-1 mapping with the smallest index assignment being '1' and the largest index assignment being '31.' The remaining characters, which are not included in any expression to be matched, valued in the range of '126'-'255,' are indexed under the value '33,' which is an invalid value since it is greater than the size of the nodal bit map. Thus, the walker process may determine if a valid arc exist, without analyzing the nodal bit map by determining if a particular character is within an allowed index range.

Comparing the example of FIG. 13 to a completely uniform N-to-1 mapping, the completely uniform N-to-1 mapping would have required an 8-to-1 mapping scheme to map all the 256 ASCII values into the 32 bits. An 8-to-1 mapping is much less efficient as compared to a 3-to-1 mapping scheme. Equivalent storage, when employing the 8-to-1 mapping scheme, to achieve the same efficiency as the example shown in FIG. 13, would require a nodal bit map configured to store 86 bits. It should further be appreciated that certain ASCII characters may be expected to be used more frequently, therefore these characters may be indexed with a 1-to-1 mapping scheme to improve efficiency and speed of the search mechanism.

FIG. 14 illustrates a nodal bit map 150C, which is an example embodiment of the bit map 150 illustrated in FIG. 10. The nodal bit map 150C also features a non-uniform mapping scheme employing 11 map entries. All ASCII characters, which are not included in a searchable expression, are grouped in the first entry indexed as '0.' It should be appreciated that the walker process may include a pre-set, where a fixed index value may be defined as included non-searchable characters. Thus, in the present example, the walker process may determine, without evaluating the nodal bit map, that the characters indexed as '0' do not include an associated valid arc.

All ASCII characters which are included in a searchable expression (i.e., characters 'C,' 'E,' 'I,' 'M,' 'N,' 'O,' 'S,' 'T,' 'U,' and 'X') are indexed into the nodal bit map according to a 1-to-1 mapping scheme. For example, the ASCII characters 'C,' 'E,' 'I,' 'M,' 'N,' 'O,' 'S,' 'T,' 'U,' and 'X' are indexed in nodal bit map 150C in indices '1'-'10,' respectively. Note that the arc including nodal bit map 150C points to a node which includes valid arcs for the ASCII characters 'N' and 'X,' thus the association indication values of these characters are assigned to '1.'

It should be appreciated that the non-searchable characters may be indexed in a non-valid index, for example '15,' which is greater than the size of the nodal bit map. Therefore, the walker process may determine, from the invalid index, that a valid arc for a particular character does not exist.

It should further be appreciated that same mapping for all searchable characters need not be employed. A weighting factor may be employed. The weighting factor may determine the likelihood of a searchable character to be analyzed by the walker process, based on either the number of times a searchable character is used within searchable expressions, or based on prior knowledge of the likelihood a character may appear in the input stream. For example, the characters 'http://' may be frequently searched for in a system searching for a particular web address. Therefore, the characters 'h' 't' 'p' ':' and '/' may include a larger weighting factor.

Thus, characters which include a higher weight (for example characters 'C,' 'O,' 'N,' and 'T,' which are included in all the searchable expressions) may include a lower N-to-1 mapping (for example 1-to-1 mapping). Meanwhile, searchable characters which are not heavily used in the searchable expression (for example characters 'X' and 'M,' which are included in only one searchable expression) may be grouped in a higher N-to-1 mapping.

FIG. 15 illustrates an example of a global look-up table that may be used to provide information to a walker process with regards to the nodal bit map illustrated in FIG. 14. The global look-up table may include 256 entries, where each entry may be dedicated to an ASCII character. The ASCII characters may be indexed in the global look-up table according to their corresponding ASCII values via a one-to-one mapping scheme. The corresponding nodal bit map index value provide an indication of where the ASCII character is indexed in each nodal bit map of the DFA graph. As explained with respect to the nodal bit map 150C of FIG. 14, all ASCII characters which are not included in a searchable expression are grouped in the first map entry indexed as '0.' Therefore, the corresponding global look-up table lists all of these characters, indexed from '0' to '66,' '68,' '70'-'77,' '80'-'82,' '85'-'87,' and '89'-'255' all include a corresponding nodal bit map index value of '0.' Thus, a walker process may utilize the global look-up table to determine which index in a nodal bit map the indicator value of a particular ASCII character is stored.

FIG. 16 provides an example of pseudo code that may be used to manage the walker process in a compressed DFA graph employing nodal bit maps featuring a non-uniform mapping scheme. A compressed node is defined by the first listed structure 251. Note that the size of the arc array is undefined as any number of arcs, or non-valid arcs, in the DFA graph may be pruned. The components of a valid arc are defined in the second structure 253. In the example provided by FIG. 16, each valid arc includes a copy of its associated ASCII character (A) and a hash function (B). The valid arc may also include various flag settings (C). The flag may indicate if the node being pointed to by the valid arc is a marked node. The valid arc may also include a node pointer (D) pointing from a prior node to a next node, and a nodal bit map (E) associated with the arc configuration of the next node.

It should be appreciated that the valid arc may also include a cache bit that may provide an indication as to whether the next node is stored in cache or external memory. The valid arc may also include a designated node identification providing information of a designated node associated with the next node, for example, in the case where more than one designated node (other than the root node) exits. Thus, if an associated valid arc is not found, the walker process may traverse to an associated designated node as per the designated node identification stored in the valid arc.

The global look-up table is defined by the third listed structure 255. Note that the global look-up table includes an array with 256 entries, with each entry being dedicated to an associated ASCII character. It should be appreciated that any uniform, non-uniform, or 1-to-1 mapping scheme may be employed in the global look-up table.

Figure 18:
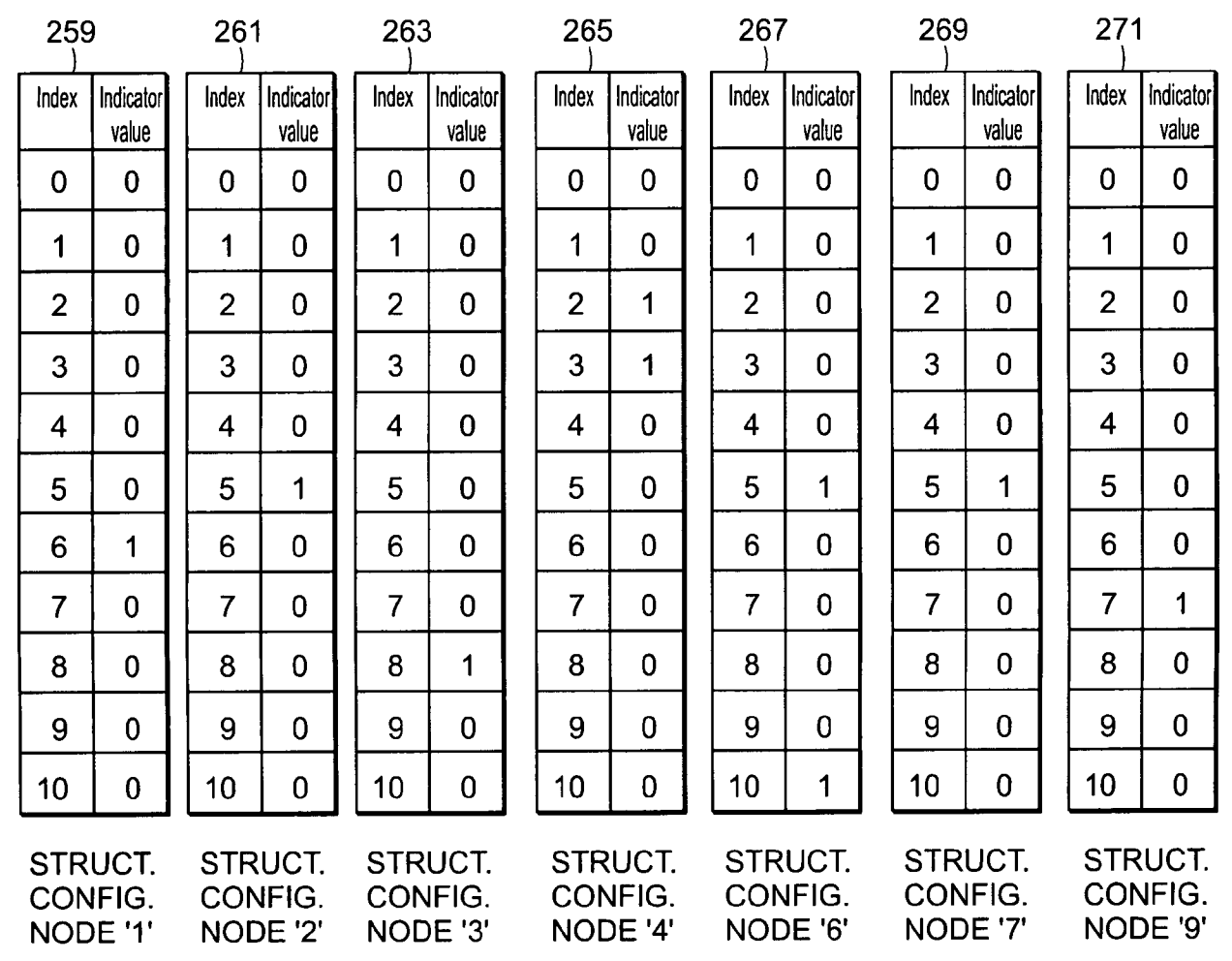

An example of the basic walker logic is described by lines 1-19 of the pseudo code illustrated in FIG. 16. The basic walker logic will be explained with the use of FIG. 17 which illustrates an example DFA graph featuring a number of nodal bit maps 259-271. FIG. 18 illustrates the entries of the nodal bit maps of FIG. 17.

Figure 17:
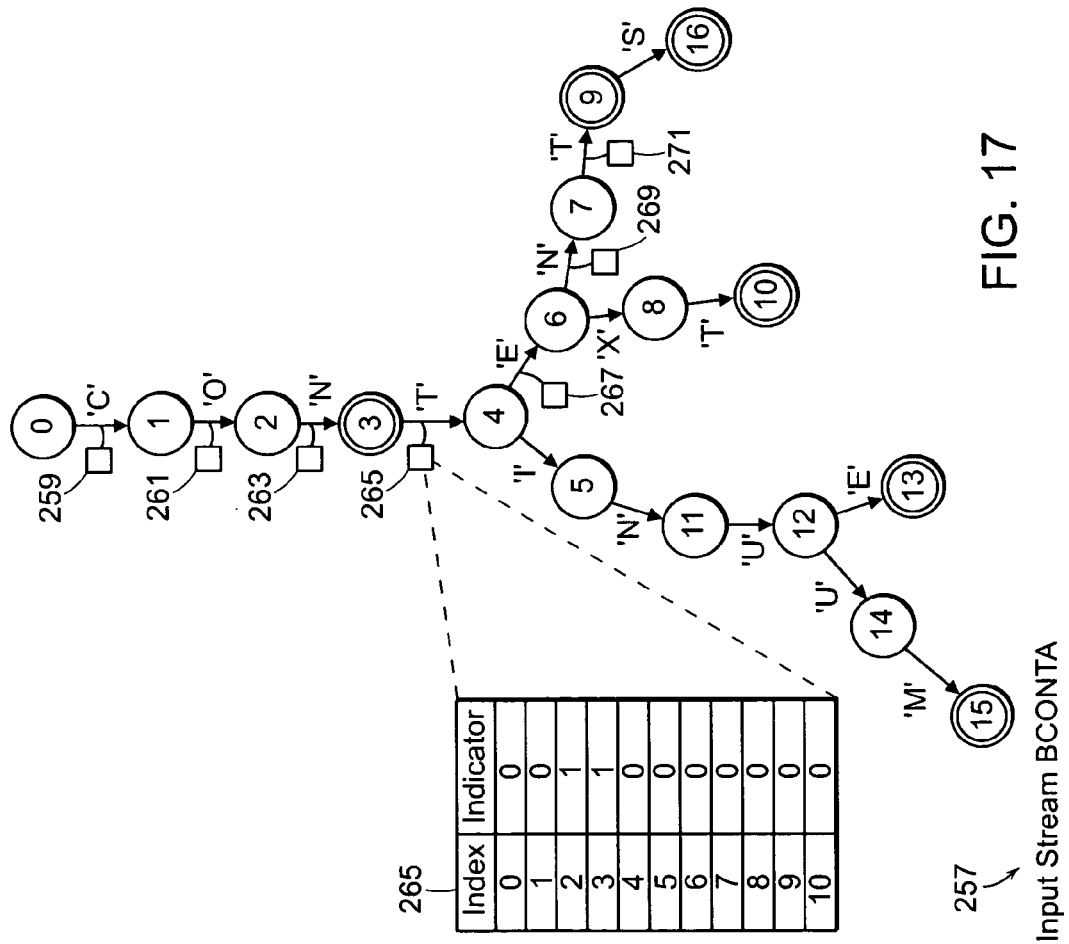
FIG. 17 is an example of a DFA graph featuring a plurality of nodal bit maps.

As the walker process begins to traverse the graph, the walker process may retrieve the node pointer and hash function associated with the root node '0' (FIG. 16, lines 1-2). The walker process may also retrieve a current character (ch1) and a next character (ch2) from an input stream 257 (FIG. 16, lines 3-4). As shown in FIG. 17, the current character of the input stream 257 is 'B' and the next character is 'C.'

Upon obtaining the current and next character, the walker process may proceed to utilize the hash function, assuming the root node is compressed, using the current character (ch1). The hash function will provide a hash value which may be assigned to an 'index' variable. Using the 'index' variable, the walker process may index into the root node in order to find a valid arc associated with the current character 'B' (FIG. 16, line 6).

Upon retrieving an arc, the walker function may retrieve the character that is stored in the arc (as defined by the arc structure 253 (A)) and compare the stored character with the current character. Since the root node of FIG. 17 only includes a valid arc associated with the character 'C,' the comparison will not provide a match as the hash function has provided a false positive (FIG. 16, lines 8-9).

Thereafter, the next character will be reassigned as the current character (i.e., 'C' will be assigned to the variable ch1) and the walker process will retrieve a new next character from the input stream 257 and assign this character to the next character variable (i.e., 'O' will be assigned to the variable ch2) (FIG. 16, lines 1-4). The walker function may proceed to utilize the hash function using the current character 'C' and obtain an index value. Using the index value, the walker function will retrieve an arc from the root node '0' (FIG. 16, lines 5-6). Upon retrieving the arc, the walker process may also retrieve the character stored in the arc and compared the stored character with the current character 'C' (FIG. 16, lines 7-8). Since the root node '0' does include a valid arc associated with the character 'C,' the character comparison will yield a match.

Upon detection of a character match, the walker process may check the status of any flags that may be associated with the node (FIG. 16, line 1). For example, a flag may be designated to indicate whether or not a node is a mark node. In the case that a node is a mark node, the walker process may send a message that an expression match has been found.

The walker process may thereafter retrieve a nodal bit map of the valid arc in the prior node, node '0' (FIG. 16, line 1). The nodal bit map 259 of valid arc associated with the character 'C' is further illustrated in FIG. 18. In the example provided by FIG. 17, the nodal bit maps 259-271 utilize the same non-uniform mapping described in relation to FIGS. 14 and 15. Thus, upon obtaining the nodal bit map 259, the walker process may access the global look up table (FIG. 15) in order to determine the indexed location of the next character (ch2), which is 'O,' in the nodal bit map 259 (FIG. 16, line 12). Therefore, using the ASCII value of the character 'O,' which is '79,' the walker process may determine that information dealing with this character is stored in the nodal bit map under the nodal bit index value of '6,' as is shown in FIG. 15.

Upon obtaining the index value, the walker process may proceed to evaluate the nodal bit map 259 and determine the indicator value associated with the index value '6' (FIG. 16, line 13). As is illustrated in FIG. 18, the ASCII character 'O,' indexed under the index value '6,' has an associated indicator value of '1' indicating that a valid arc associated with the next character 'O' exits in the current node, node '1.' Note that in hardware implementation access of the global look-up table using the next character (ch2), accessing of the prior node arc using the current character (ch1), may be done in parallel.

Therefore, having the indication that a valid arc exists, the walker process may proceed to utilize the hash function stored in the valid arc using the value of the next character 'O.' The walker process may then retrieve, in memory, the arc from current node, node '1.' Retrieval of the arc in the current node may require an external memory access, therefore providing an indication of whether or not a particular valid arc exits in the current node may aid in reducing unnecessary accesses to external memory. It should be appreciated however, since a one-to-one mapping scheme are not employed in the nodal bit maps, false positives with respect to indicator values may occur.

Using the hash function obtained from the valid arc associated with the character 'C,' the walker process may obtain a hash index that may be utilized for indexing into the node '1.' Via the indexing, a valid arc associated with the current character 'O' may be obtained (FIG. 16, line 6). In order to ensure a false positive has not been provided by the indicator value, the walker process may compare the current character 'O' with an extracted character copy included in the valid arc. Since the node, node '1,' does include a valid arc for the character 'O,' the character comparison will indicate that a match has been found (FIG. 16, lines 7-9).

Following the same process, a valid arc may also be obtained for the character 'N' of node '2' Note that node '2' points to a marked node, therefore the flag setting associated with the valid arc of character 'N' may be configured to indicate that an expression match for the term 'CON' has been found.

Evaluating the input stream 257 with the walker process utilizing the pseudo code of FIG. 16, a valid arc associated with the character 'T' may also be obtained. The walker process may evaluate the nodal bit map 265 associated with the valid arc of the character 'T.' Prior to evaluating the nodal bit map 265, the walker process may access the global look-up table (FIG. 15) in order to determine the nodal bit map index associated the next character in the input stream 'A.' As is illustrated in the global look-up table, the nodal bit map index associated with the character 'A' is '0.' Upon determining that the index value for the character 'A' is '0,' the walker process may immediately determine that no valid arc exist for character 'A.' Alternatively the walker process may evaluate the nodal bit map and determine that the indicator value associated with the index '0' is also '0' therefore indicating no valid arc exits.

It should be appreciated that had a 1-to-1 mapping not been employed for the searchable characters (as shown in the example provided by FIG. 13) false positives may occur. For example, if a non-searchable character is included in a same grouping or range as a searchable character, the non-searchable character may yield an indicator value of '1.' The realization of a false positive may be made during the character comparison provided by the walker process (FIG. 16, line 8).

Once a false positive, or a non-valid character is found in a particular node, the character may be analyzed again in a root node, or a designated node. This reevaluation is referred to as a rescan. It should be appreciated that the nodal bit maps may aid in reducing the number of times a character is evaluated. For example, a walker process may determine that a valid arc does not exist for a particular character by evaluating the index provided for that particular character, thus eliminating the need to scan a node or rescan a designated node.

Those of ordinary skill in the art should recognize that methods involved in providing the example embodiments described above may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as electromagnetic signals propagating on a computer network, a bus or a communications link, either optical, wired, or wireless, carrying program code segments as digital or analog data signals. The program code enables and supports computer implementation of the operations described in FIGS. 1A-18 or any other described embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer implemented method comprising:
   by a processor, given a current node and an arc pointing from the current node to a next node, analyzing arcs in a data structure to determine which of the arcs are valid arcs pointing from the next node;
   by the processor, constructing arc configuration information associated with the next node, the arc configuration information limited to only arc configuration information of the next node and representing each valid arc pointing from the next node; and
   by the processor, storing the arc configuration information associated with the next node, enabling the arc configuration information to be evaluated and each of the valid arcs pointing from the next node to be identified from the evaluation of the arc configuration information without the next node being read to reduce memory accesses and processing time of the processor.

2. The method of claim 1, wherein storing the arc configuration information includes storing the arc configuration information in the arc pointing from the current node to the next node.

3. The method of claim 1, wherein storing the arc configuration information includes storing the arc configuration information in a table accessed via an identifier of the next node.

4. The method of claim 1, wherein the data structure is an automata graph.

5. The method of claim 1, wherein the arc configuration information comprises a bit map.

6. The method of claim 1, wherein constructing the arc configuration information associated with the next node includes:
   providing a listing of indicator values, each indicator value being associated with a respective character, each indicator value providing an indication of whether a valid arc associated with a respective character exists in the next node;
   assigning a negative value to an indicator value if the associated valid arc does not exist in the next node; and
   assigning a positive value to an indicator value if the associated valid arc does exist in the next node.

7. The method of claim 6, further including:
   traversing the data structure with a walker process to search for a match of at least one expression in an input stream;
   retrieving the arc associated with a current character of the input stream in the current node;
   reading the arc configuration information associated with the next node;
   determining the indicator value associated with a next character in the input stream; and
   accessing a valid arc in the next node associated with the next character if the indicator value is positive.

8. The method of claim 1, wherein constructing the arc configuration information associated with the next node further includes:
   providing a listing of indicator values, each indicator value being associated with a respective range of characters, each indicator value providing an indication of whether one valid arc associated with at least one respective character in the respective range exists in the next node;
   assigning a negative value to an indicator value if all valid arcs in the respective range do not exist in the next node; and
   assigning a positive value to an indicator value if at least one valid arc in the respective range exists in the next node.

9. The method of claim 8, further including:
   traversing the data structure with a walker process to search for a match of at least one expression in an input stream;
   retrieving the valid arc associated with a current character of the input stream in the current node;
   reading the arc configuration information associated with the next node;
   determining the indicator value associated with a next character in the input stream; and
   accessing an arc in the next node associated with the next character if the indicator value is positive.

10. The method of claim 8, wherein constructing the arc configuration information associated with the next node further includes defining each respective range as having an equal number of associated characters.

11. The method of claim 10, wherein reading the arc configuration information associated with the next node further includes dividing a numerical value associated with the next character by the number of characters included in each range, and determining a location of the indicator value associated with the next character as a function of the division.

12. The method of claim 10, wherein reading the arc configuration information associated with the next node further includes reading a global look-up table to determine a location of the indicator value associated with the next character.

13. A system for locating an expression in a data structure, the system comprising:
a processor executing a walker process configured to traverse the data structure, the data structure including a plurality of interconnected nodes, wherein at least one node includes at least one valid arc; and
stored arc configuration information associated with a next node, the at least one valid arc associated with a current node and pointing from the current node to the next node, the arc configuration information limited to only arc configuration information of the next node and representing each valid arc pointing from the next node, the stored arc configuration information enabling each of the valid arcs pointing from the next node to be identified by the processor without the next node being read to reduce memory accesses and processing time of the processor.

14. The system of claim 13, wherein the stored arc configuration information is stored in the at least one valid arc associated with the current node and pointing from the current node to the next node.

15. The system of claim 13, wherein the stored arc configuration information is stored in a table accessed via an identifier of the next node.

16. The system of claim 13, wherein the data structure is an automata graph.

17. The system of claim 13, wherein the stored arc configuration information includes:
a listing of indicator values, each indicator value being associated with a respective character, each indicator value providing an indication of whether a valid arc associated with a respective character exists in the next node;
wherein an indicator value is negative if the associated valid arc does not exist in the next node; and
wherein an indicator value is positive if the associated valid arc does exist in the next node.

18. The system of claim 17, wherein the walker process is further configured to:
retrieve the at least one valid arc pointing from the current node to the next node and associated with a current character of an input stream;
read the stored arc configuration information associated with the next node; and
determine the indicator value associated with a next character in the input stream, wherein the walker process accesses in memory the next valid arc associated with the next character if the indicator value is positive.

19. The system of claim 13, wherein the stored arc configuration information includes:
a listing of indicator values, each indicator value being associated with a respective range of characters, each indicator value providing an indication of whether one valid arc associated with at least one respective character in the respective range exists in the next node;
wherein an indicator value is negative if all valid arcs in the respective range do not exist in the next node; and
wherein an indicator value is positive if at least one valid arc in the respective range exists in the next node.

20. The system of claim 19, wherein the walker process is further configured to:
retrieve the at least one valid arc pointing from the current node to the next node and associated with a current character of an input stream;
read the stored arc configuration information associated with the next node; and
determine the indicator value associated with a next character in the input stream, wherein the walker process accesses in memory the next valid arc associated with the next character if the indicator value is positive.

21. The system of claim 20, wherein each respective range of the stored arc configuration information has an equal number of associated characters.

22. The system of claim 21, wherein the walker process is further configured to:
divide a numerical value associated with the next character by the number of characters included in each range; and
determine a location of the indicator value associated with the next character as a function of the division.

23. The system of claim 19, further including a global look-up table providing location information of the indicator value associated with the next character.

24. The system of claim 13, wherein the stored arc configuration information comprises a bit map.

25. A computer implemented method for traversing a data structure comprising:
traversing nodes in the data structure, with a walker process, to search for an expression in an input stream;
retrieving an arc associated with a current character of the input stream, the arc pointing from a current node to a next node;
reading arc configuration information associated with the next node, the arc configuration information limited to only arc configuration information of the next node and representing each valid arc pointing from the next node;
determining if a next valid arc associated with a next character of the input stream exists in the next node based on a search indication provided by the reading; and
accessing in memory the next valid arc associated with the next character if the search indication is positive.

26. A computer implemented method for traversing a data structure comprising:
traversing nodes in the data structure with a processor coupled to a memory and configured to traverse the nodes based on arc configuration information associated with a next node and stored in the memory, the arc configuration information limited to only arc configuration information of the next node and representing each valid arc pointing from the next node, to search for an expression in an input stream, each valid arc associated with a current character of the input stream.

27. The computer implemented method of claim 26, further comprising:
determining if a next valid arc associated with a next character of the input stream exists in the next node based on an indicator value included in the arc configuration information; and
accessing in memory the next valid arc associated with the next character based on the indicator value.

28. The computer implemented method of claim 26, wherein the arc configuration information comprises a bit map.

29. The computer implemented method of claim 28, wherein each bit in the bit map represents a 1-to-1 mapping of a given arc to an indicator value representing validity of the given arc.

30. The computer implemented method of claim 29, wherein each bit in the bit map represents an N-to-1 mapping of multiple given arcs to an indicator value representing validity of the multiple given arcs.

\* \* \* \* \*